(12) United States Patent
Richardson et al.

(10) Patent No.: US 6,373,961 B1
(45) Date of Patent: Apr. 16, 2002

(54) EYE CONTROLLABLE SCREEN POINTER

(75) Inventors: Jim Richardson, Philomath, OR (US); Gregory T. Kavounas, Vancouver, WA (US)

(73) Assignee: Eye Control Technologies, Inc., Corvallis, OR (US)

( * ) Notice: Subject to any disclaimer, the term of this patent is extended or adjusted under 35 U.S.C. 154(b) by 0 days.

(21) Appl. No.: 09/154,406

(22) Filed: Sep. 14, 1998

Related U.S. Application Data

(63) Continuation of application No. 08/623,898, filed on Mar. 26, 1996, now abandoned.

(51) Int. Cl.$^7$ .................................................. G06K 9/00
(52) U.S. Cl. ........................................... 382/103; 345/8
(58) Field of Search ................................. 382/103, 107, 382/154, 255, 277, 100; 351/209–210, 237; 345/7–9; 359/676–678

(56) References Cited

U.S. PATENT DOCUMENTS

| | | | |
|---|---|---|---|
| 4,102,564 A | * 7/1978 | Michael | 351/210 |
| 4,349,815 A | 9/1982 | Spooner | 345/8 |
| 4,439,755 A | 3/1984 | LaRussa | 340/980 |
| 4,565,999 A | 1/1986 | King et al. | 345/158 |
| 4,682,159 A | 7/1987 | Davison | 345/158 |
| 4,688,037 A | 8/1987 | Krieg | 340/825.72 |
| 4,768,028 A | 8/1988 | Blackie | 345/8 |
| 4,852,988 A | 8/1989 | Velez et al. | 351/210 |
| 4,878,046 A | 10/1989 | Smith | 345/8 |
| 5,003,300 A | 3/1991 | Wells | 345/8 |
| 5,168,531 A | 12/1992 | Sigel | 382/291 |
| 5,189,512 A | 2/1993 | Cameron et al. | 348/838 |
| 5,220,361 A | 6/1993 | Lehmer et al. | 351/226 |
| 5,231,674 A | 7/1993 | Cleveland et al. | 382/117 |
| 5,239,337 A | 8/1993 | Takagi et al. | 396/51 |
| 5,245,381 A | 9/1993 | Takagi et al. | 396/287 |
| 5,262,807 A | 11/1993 | Shindo | 351/210 |
| 5,325,133 A | 6/1994 | Adachi | 351/209 |
| 5,333,029 A | 7/1994 | Uchiyama et al. | 396/51 |
| 5,341,181 A | * 8/1994 | Godard | 351/210 |
| 5,345,281 A | 9/1994 | Taboada et al. | 351/210 |
| 5,382,989 A | 1/1995 | Uomori et al. | 351/209 |
| 5,726,916 A | * 3/1998 | Smyth | 702/151 |

FOREIGN PATENT DOCUMENTS

| | | |
|---|---|---|
| GB | 1259457 | 1/1972 |
| GB | 1489758 | 10/1977 |
| GB | 1557511 | 12/1979 |
| GB | 1578136 | 11/1980 |
| GB | 2117609 | 10/1983 |

* cited by examiner

*Primary Examiner*—Jayanti K. Patel
(74) *Attorney, Agent, or Firm*—Klarquist Sparkman, LLP

(57) ABSTRACT

An eye controllable screen pointer system is provided that combines eye gaze tracking and screen tracking from the point of view of the user. Screen tracking is performed by a screen tracking camera, attached to a helmet the user is wearing. The screen tracking camera is aided by either light emitted from screen beacon located near the screen, or by a light pattern emitted from the screen itself as a screen beacon signal. The screen tracking means provides a screen tracking signal. Eye gaze tracking is performed as is known in the art, or according to a novel way described herein. An eye gaze tracking means is attached to the helmet, and provides an eye tracking signal. The information carried in the screen tracking signal and in the eye tracking signal are combined in a calculation by a processing means residing in a processor to produce a point of computed gaze on the screen. In an alternate embodiment of the invention, the input device of both the eye gaze tracking means and the screen tracking camera are combined into a single video camera, thus resulting in a simplified apparatus. Optionally, the system further projects a mark at the point of computed gaze.

30 Claims, 12 Drawing Sheets

EYE CONTROLLABLE SCREEN POINTER

RELATED APPLICATIONS

This application is a continuation of application Ser. No. 08/623,898, filed Mar. 26, 1996 and now abandoned.

FIELD OF THE INVENTION

The present invention is related to the field of eye controllable screen pointer systems that use eye gaze tracking devices.

BACKGROUND OF THE INVENTION

An eye controllable screen pointer system comprises either an eye gaze tracking means or a head tracking means, or both, working in combination with a screen. In such an application, choices are usually displayed in different areas of the screen, and the user selects a choice by looking at it, i.e. by directing his gaze at it. The system infers where on the screen the user is directing his gaze at from eye gaze tracking information and/or head tracking information that is made available by their respective means. Often, and for feedback to the user, the system also projects a mark at the point of the screen that the system inferred that the user is looking at.

Since the head tracking problem was solved before the eye gaze tracking problem, the earlier systems were head tracking only systems. The user would wear a helmet, and was assumed to be gazing straight ahead. The user would move his head (thus also moving the helmet) to face exactly one of the choices displayed on the screen. A classic such system is described in U.S. Pat. No. 4,349,815 to Spooner. Head movement is registered by the perceived helmet movement. Another example of a head tracking only system is U.S. Pat. No. 4,682,195 to Davison. An ultrasonic signal tracks the position and orientation of a helmet with respect to the screen. Similarly, light pen systems (such as the one taught in U.S. Pat. No. 4,565,999 to King et al.) require head movement. In such head tracking only systems, only head movement is registered. Even if the user shifts his eye gaze to a direction other than straight ahead, such is not registered.

Most of the prior art solves the head tracking problem from a reference point of the screen. The approach assumes that the screen is stationary, and tracks the head movement. The approach has drawbacks, such as requiring expensive components to implement. Additionally, the prolonged head movement required to operate a head tracking only system is tiring to the user's neck.

Eye gaze tracking means are those means that detect which direction the user is gazing at, with respect to his face. The direction of the eye gaze is detected by methods such as the corneal reflection method, described in U.S. Pat. No. 5,231,674 to Cleveland. Eye gaze tracking only systems generally require the user to not move his head, because that could introduce lateral error. That requirement can make a user's neck stiff, because a healthy user will ordinarily move his head slightly. Alternately, some lateral error can be tolerated, but that would be at the expense of the screen resolution not being very high (which would allow ultimately fewer choices to be displayed on the screen).

Most systems of the prior art utilize either head tracking means only, or eye gaze tracking means only. But even systems that combine both head tracking and eye gaze tracking are characterized by the high expense resulting from including the head tracking components.

SUMMARY OF THE INVENTION

It is an object of the present invention to provide an eye controllable screen pointer that has none of the disadvantages of the prior art.

It is another object of the present invention to provide an eye controllable screen pointer that permits ordinary head movement of the user, while having none of the disadvantages of the head tracking techniques.

It is yet another object of the present invention to provide a simplified eye controllable screen pointer that uses a single input device for both a head tracking function and an eye gaze tracking function.

It is one more object of the present invention to provide an eye controllable screen pointer that can be manufactured economically.

According to the present invention, an eye controllable screen pointer system is provided that uses eye gaze tracking while simultaneously bypassing the problems of head tracking. The eye controllable pointer system of the present invention reverses the frame of reference of the head tracking problem, by treating the actual ordinary head movement of the user as instead an apparent movement of the screen with respect to the user's head. Thus, instead of performing head tracking, the screen pointer system of the present invention performs screen tracking with respect to the user's head. Screen tracking is performed by a screen tracking camera, attached to a helmet the user is wearing. The screen tracking camera is aided by either light emitted from a screen beacon located near the screen, or by a light pattern emitted by the screen itself as a screen beacon signal. The screen tracking camera provides a screen tracking signal. Eye gaze tracking is performed as is known in the art, or according to a novel way described herein. An eye gaze tracking means is also attached to the helmet, and provides an eye tracking signal. The information carried in the screen tracking signal and in the eye tracking signal are combined in a calculation by a processing means residing in a processor to produce a point of computed gaze on the screen. In an alternate embodiment of the invention, the input device of both the eye gaze tracking means and the screen tracking camera are combined into a single video camera, thus resulting in a simplified apparatus. Optionally, the system further projects a mark at the point of computed gaze.

A main advantage of the present invention with respect to the prior art is a significantly lower cost, resulting from the lower cost of the screen tracking components compared to those required for head tracking. This and other objects and advantages of the present invention will be more appreciated and understood after a consideration of the following drawings and the detailed description of the invention.

DETAILED DESCRIPTION OF THE INVENTION

Figure 1:
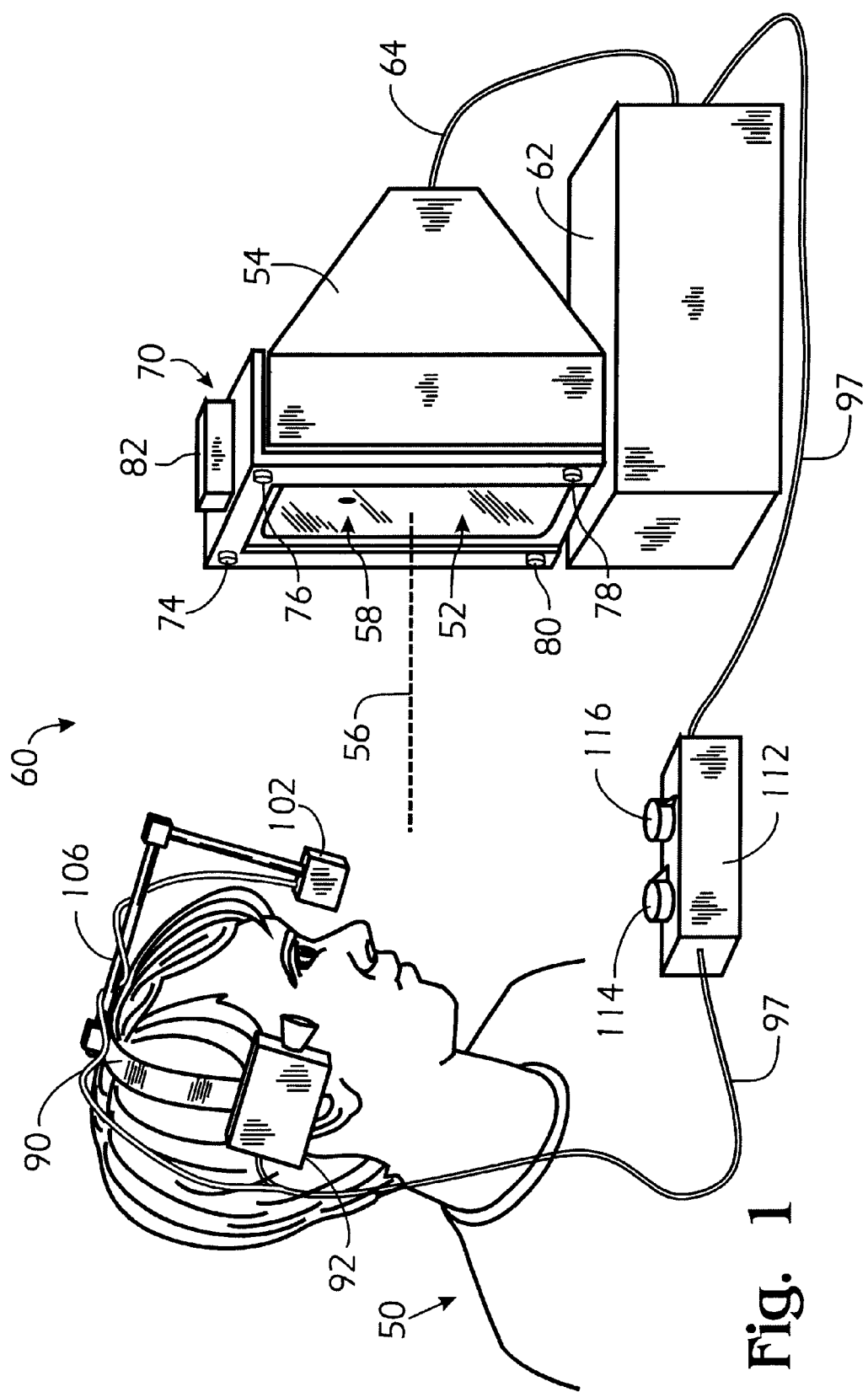
FIG. 1 illustrates a user using a generic embodiment of the present invention.
Figure 2:
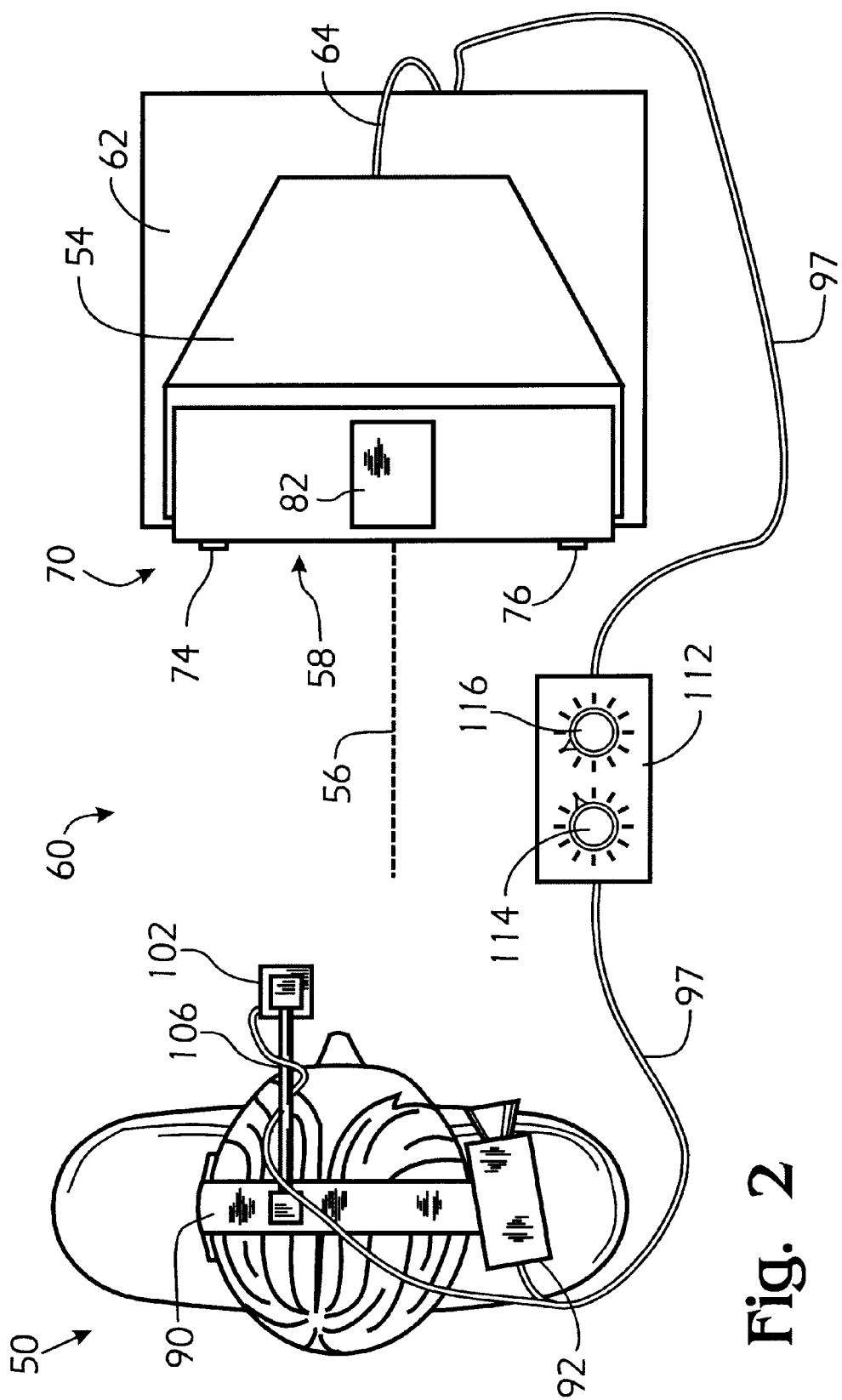
FIG. 2 illustrates a plan view of FIG. 1.

A generic embodiment of the eye controllable screen pointer system of the present invention can be seen in FIGS. 1 and 2. A user 50 is situated in such a way that he generally faces a screen 52. The screen 52 can be a computer screen, a display monitor, or other display panel. The screen 52 of the preferred embodiment of the present invention is the screen 52 that is part of a computer monitor 54. In the embodiment of FIG. 1, all items that are connected with the screen 52 are really connected with the computer monitor 54. The screen 52 is considered to have a center line 56, that is perpendicular to, and intersects the screen 52 at the center. The user 50 is gazing at a point of true gaze 58 on the screen 52. The point of true gaze 58 is a physical location on the screen 52. Any point on the screen 52 can be considered to have coordinate values with respect to the screen 52, as is known in the art. These coordinate values are typically given as numbers of pixels, measured horizontally and vertically from a corner of the screen 52.

The present invention is an eye controllable pointer system 60 for the user 50 and the screen 52. A generic embodiment of the present invention comprises a processor 62 connected with the screen 52. The processor 62 can be implemented by a properly programmed, general purpose computer 62, or a special purpose computer. The processor 62 can be distributed, i.e. have a portion that is securable in the belt of the user 50. Connecting a general purpose computer 62 to a monitor 54 can be by a cable 64, as is well known in the art.

Figure 3:
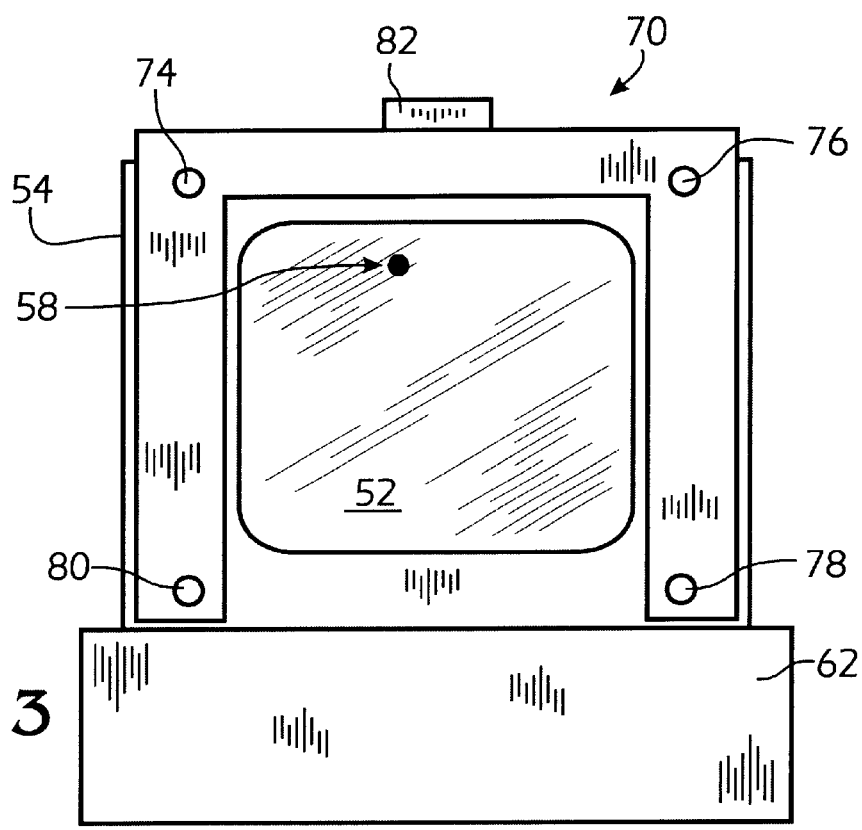
FIG. 3 illustrates a view of the screen facing the user of FIG. 1.
Figure 4:
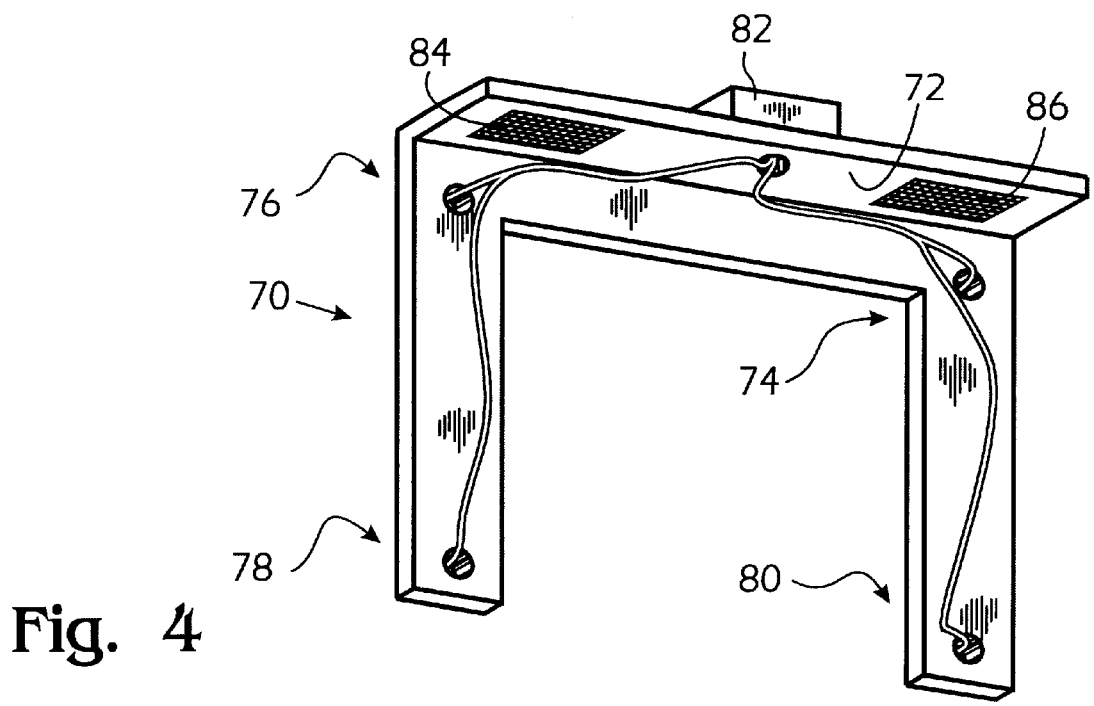
FIG. 4 illustrates a perspective view of the underside of the screen beacon of FIGS. 1, 2, and 3.

The eye controllable screen pointer system 60 of the present invention additionally comprises a screen beacon 70, as will be explained in reference with additionally FIGS. 3 and 4. FIG. 3 illustrates a view of the screen 52 facing the user 50 of FIGS. 1 and 2. FIG. 4 illustrates a perspective view of the underside of the screen beacon 70, considered removed from the monitor 54 of FIGS. 1, 2 and 3. The screen beacon 70 of the present invention is intended to be a light beacon that can be imaged by a screen tracking camera that is present on the wearer's helmet, as will be explained below. The whole idea behind the design of a screen beacon 70 is that it be otherwise non intrusive to the user's 50 view of the screen 52.

Generally, the screen beacon 70 of the present invention can be implemented as a frame 72 that has a plurality of light sources 74, 76, 78, 80, and a control mechanism that electrically drives the light sources 74, 76, 78, 80. The control mechanism is contained in a housing 82. The control mechanism may operate on batteries or have a cable (not shown) that is to be connected to an ordinary electrical power source. The control mechanism operates preferably by converting AC power into DC power. The housing 82 is attached to the frame 72, and is preferably made of non shiny material, so as not to introduce spurious images in the field of view of the screen tracking camera that will be discussed below. The frame 72 can have means of attachment to the monitor 54, such as velcro strips 84, 86.

The screen beacon 70 of the present invention has an ensemble of light sources 74, 76, 78, 80. In general, the ensemble comprises at least one light source. In the case of the screen beacon 70 of FIGS. 1–4, there are four point light sources 74, 76, 78, 80. In general, the light sources of the screen beacon 70 present two identifiable (and preferably perpendicular) dimensions to the screen tracking camera. This objective can be accomplished by the screen beacon 70 having as few as three point light sources, not arranged in a straight line. Or it can be accomplished by the screen beacon 70 being a single light source that is extended in at least two dimensions.

The screen beacon 70 of the present invention is placed in a fixed spatial relationship with respect to the screen 52. The fixed spatial relationship is really a relationship of their respective locations, and can be simply that the screen beacon 70 is placed next to the screen 52. The preferred spatial relationship of the screen beacon 70 of FIGS. 1–4 is such that the four light sources 74, 76, 78, 80 will end up surrounding the screen 52 as shown. The spatial relationship is fixed in that the screen beacon 70 should not be moved relative to the screen 52 during operation of the screen pointer system 60 of the present invention. The spatial relationship of the screen beacon 70 with respect to the screen 52 is either predetermined, or will be learned for further processing by the system 60 by using an initialization technique.

Additionally, in the case of the screen beacon 70 of FIGS. 1–4, the point light sources 74, 76, 78, 80 surround the screen 52 while forming a perfect rectangle, and further with a width-to-height aspect ratio that is identical to that of the screen 52, as is additionally preferred. That is accomplished by the screen beacon 70 having exactly four light sources, one corresponding to each corner of the screen. Finally, it is preferred that the screen beacon 70 can be and is actually fitted over the screen 52 in such a way that an assumed diagonal line drawn to connect light sources 76 and 80 will cross the top right and bottom left corners of the screen 52, and a second diagonal line drawn to connect light sources 74 and 78 will cross the top left and bottom right corners of the screen 52.

Point light sources are preferred over extended ones, because they will be imaged as dots, which will simplify the mathematical processing, as will be elaborated on below. Suitable point light sources 74, 76, 78, 80 that can be used for the screen beacon 70 are LEDs. LEDs are generally small and can be bright. In some instances the LEDs of the screen beacon 70 preferably emit in the Infra Red ("IR"), so that the user 50 does not see their light. It is preferred that the LEDs 74, 76, 78, 80 are supplied by DC power from the control mechanism, so that they do not flash at the 60 Hz (or 50 Hz) frequency of the AC power.

It is perfectly conceivable that screens will be manufactured with built-in and integrated screen beacons. An advantage will be that the spatial relationships of the LEDs with respect to such screens will be made exact at the point of manufacture. Such screen beacons are well within the meaning of the present description.

Returning to FIGS. 1 and 2 only, the eye controllable pointer system 60 of the present invention additionally comprises a helmet 90. The helmet 90 is capable of being secured snugly to the head of the user 50, while it does not need to enclose the entire head.

The eye controllable pointer system 60 of the present invention further comprises a screen tracking camera 92. "Camera" under this description means any combination of a lens or aperture combined with an imaging focal plane, plus imaging hardware that enables continuous imaging. Further, a camera can comprise secondary hardware, including transmitting hardware. This definition of a camera is intended regardless of the specific function of the camera, whether it is a screen tracking camera, an eye gaze tracking camera, or both simultaneously.

The screen tracking camera 92 is preferably a video camera. Video cameras exist in the market that are smaller and lighter than is suggested by the size of the screen tracking camera 92. A type of camera that will do well is item G3230, sold by H&R Company, P.O. Box 122, Bristol, Pa. 19007-0122. The screen tracking camera 92 can be an analog camera. In that case, signal processing down the line may use Analog to Digital ("A2D") conversion. Alternately, it can be a chip camera that could have a built-in A2D converter, which would output a digital signal. At the focal plane, the screen tracking camera 92 can have a rectangular array of 512×480 detectors, but that may require enhanced imaging techniques that are known in the art. Preferably, the screen tracking camera 92 will have 1024×1024 detectors at the focal plane. That is a number large enough to give good resolution without requiring enhanced imaging techniques.

The screen tracking camera 92 is mounted on the helmet 90 and oriented in such a way that it can receive images of the screen beacon 70, when (a) the helmet 90 is secured to the head of the user 50, and (b) the user 50 generally faces the screen 52. Accordingly, the screen tracking camera 92 is not mounted on the helmet 90 facing "straight ahead" (i.e. in a line parallel to the centerline 56 of the screen 52), but is tilted "inward" to face the center of the screen 52 as shown.

The screen tracking camera 92 generates a screen tracking signal which corresponds to images received by the screen tracking camera 92. In general, the screen tracking signal helps calculate the location of the screen 52 with respect to helmet 90, and is preferably in real time. The screen tracking signal is intended to yield this information by being analyzed by the processing means as will be explained below.

Figure 5:
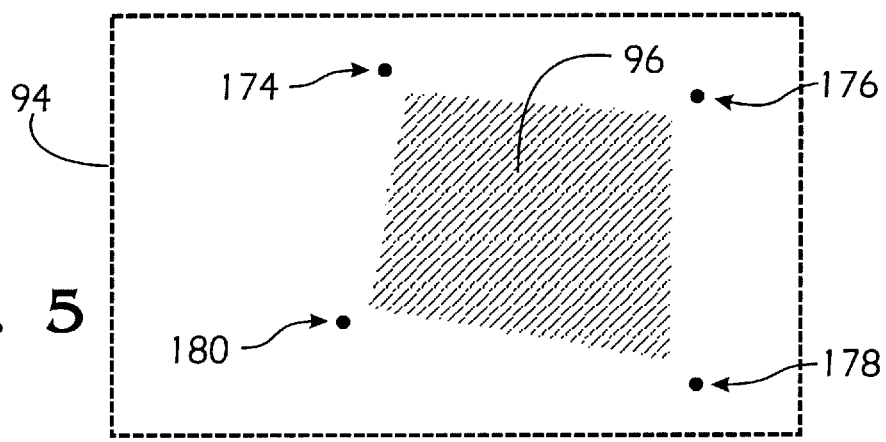
FIG. 5 represents a typical image received by the screen tracking camera of FIG. 1.

FIG. 5 represents a typical image received by the screen tracking camera 92 of FIGS. 1 and 2. There are many noteworthy features. The dashed border 94 indicates the limit of the focal plane, and thus represents the available field of view of the screen tracking camera 92. Four dots 174, 176, 178 and 180 are the images of the LEDs 74, 76, 78, 80 of the screen beacon 70. These dots 174, 176, 178 and 180 are bright compared to the ambient illumination. Note that in actuality the image of FIG. 5 (along with all other images depicted in this document) should really be shown as spatially inverted, if properly considered being on a focal plane. That would result from the pinhole effect of the screen tracking camera that is in use. Actual processing, however, will take into account the inversion in a manner that will become obvious in view of the present description and the prior art. Accordingly, the inversion is not being considered, to keep this and other drawings and the discussion simple. So, when in the present disclosure there are mentions of "right", "left" "up", and "down" of an image with respect to the screen 52, the opposite may be meant, but with no loss of generality.

The pattern of the screen beacon LEDs 74, 76, 78 and 80 is a perfect rectangle. The pattern of the screen beacon images 174, 176, 178 and 180 is generally not a rectangle, yet it corresponds to the rectangular pattern of the screen beacon LEDs 74, 76, 78 and 80. The reason is that the screen tracking camera 92 has a single point perspective with respect to the rectangular pattern of the point light sources 74, 76, 78 and 80. In the case of FIG. 5, the screen tracking camera 92 is off the center line 56, and closer to the right edge of the screen 52 than to the left.

The image of FIG. 5 further features a generally bright (as compared to the ambient illumination) area 96, shown as the shaded area 96. The shaded area 96 corresponds to the image of the actual screen 52. In general, the image of the actual screen 52 alone is not a reliable enough indicator of where the screen 52 is. This is because the image of the screen 52 alone could contain many dark areas. For example, a video game that shows a background of a dark sky would not show up as a generally bright area 96 in FIG. 5. That is why mathematical processing to determine the location of the screen 52 with respect to the helmet 90 will be assisted by knowledge of the screen beacon 70 through the screen beacon images 174, 176, 178 and 180. These will form border points around which a location will be reconstructed for the screen 52 during processing.

The entire image of FIG. 5 is received by the detector array at the focal plane of the screen tracking camera 92. Each detector element of the focal plane array returns a detected value depending on how much light it has received. These detected values will be grouped according to a predefined protocol, and comprise the screen tracking signal.

The screen tracking camera 92 is connected with and transmitting to the processor 62 the screen tracking signal. The connection can be by electrical wires 97 or optical fibers, as is known in the art. The connection can also be wireless, so that the user 50 will not feel tied to the screen 52. A wireless connection can be by radio broadcasting of analog or digital signals, IR transmissions, etc., as is known in the art. In the event that the processor 62 is distributed, and a portion of it is tied to the user's 50 belt, the connection can be by wire between the helmet 90 and the belt portion, with communication between the distributed portions of the processor 62 being wireless.

The eye controllable pointer system 60 of the present invention further comprises a processing means, that resides in the processor 62. The processing means is preferably software that is implemented in conjunction with the processor 62 and the other components of the eye controllable pointer system 60. The processing means is capable of perceiving the screen tracking signal that has been transmitted to the processor 62, analyzing it according to the predefined protocol, and performing mathematical operations.

Figure 6:
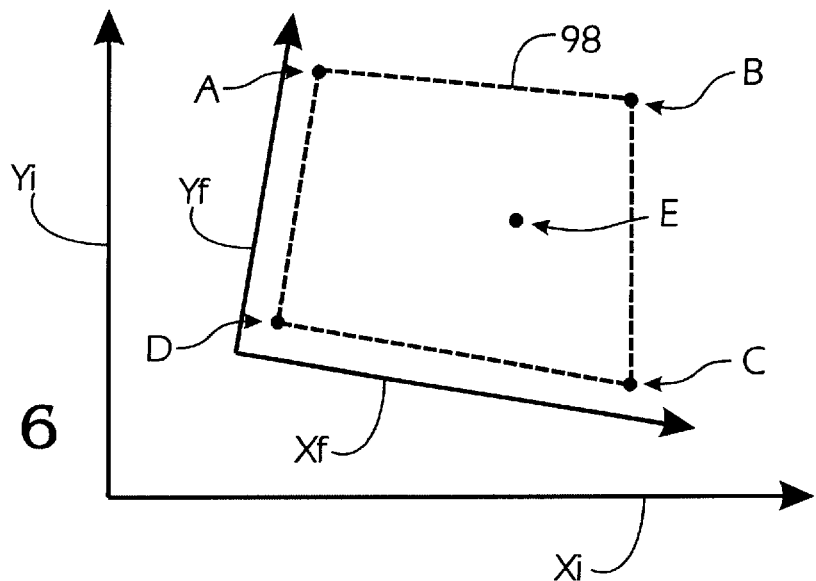
FIG. 6 represents a general screen area shape derived by mapping detected values of the image of FIG. 5 in sets of coordinate axes.

Specifically, the processing means decomposes the detected values of the screen tracking signal and maps them in a rectangular coordinate plot, such as is shown in FIG. 6. The mapped values will thus become a representation of the total received image, which is processed as will be described below, and in reference with FIG. 6. Processing starts with assuming an initial pair of coordinate axes, namely the Xi axis and the Yi axis. The set of axes has been chosen in FIG. 6 in such a location that any initial point originally within the field of view 94 of FIG. 5, would obtain positive x- and y-values, if digitized, i.e. if mapped within the coordinate axis system. Such was not necessary, however.

Then the four screen beacon images 174, 176, 178 and 180 of FIG. 5 are mapped into border points A, B, C and D, respectively, of FIG. 6. A mathematical algorithm seeks, identifies, and confirms four points A, B, C and D, as corresponding to the screen beacon images 174, 176, 178 and 180. The algorithm can be designed by techniques known in the prior art. One such technique is to identify "bright" points (i.e. with high value compared to the ambient), and then search all around them for a consistently low value. A bright point in such an algorithm can comprise one detector value (pixel) or a small cluster, depending on initial system design parameters. If the identified bright point is not a part of an elongated bright image but is stand alone, then it is confirmed as a border point. If four border points are not confirmed, the algorithm can issue an alarm, to the effect that the user 50 is not generally facing the screen. The alarm can be an audible signal.

According to the present embodiment, the bright area 96 of FIG. 5 is not imaged in FIG. 6. In other words, the algorithm that identified and confirmed the border points A, B, C, and D would reject the image 96 of the screen 52 and not plot it. If the screen 52 had been plotted, such a plot would have been entirely within the general screen area shape 98, obtained by what is enclosed by the border points A, B, C and D. That is because the four LEDs 74, 76, 78 and 80 surround the actual screen 52.

The image of FIG. 5 has other noteworthy features, that are mirrored in the coordinate plot of FIG. 6. First, in FIG. 5, the general pattern of the images 174, 176, 178 and 180 is not necessarily centered within the field of view 94. That is the general case, which would happen if the user 50 is not facing exactly towards the center of the screen 52, which would cause the screen tracking camera 92 to not be aimed exactly at the center of the screen 52. Second, in FIG. 6, two line segments AB and DC are not horizontal, but are sloping down when considered in a left-to-right direction. That happens when the user 50 is tilting his head.

Additionally in FIG. 6, the generic shape ABCD is not a perfect rectangle, because it corresponds to the shape formed by the screen beacon images 174, 176, 178 and 180 of FIG. 5, which were not arranged in a perfect rectangle. Indeed, line segment BC of the generic shape ABCD of FIG. 6 is longer than AD. The generic shape ABCD of FIG. 6 will be converted mathematically to an equivalent perfect rectangle by a rectangularization process that will be described later. The equivalent perfect rectangle will correspond to the screen 52. Thus, the border points A, B, C and D of FIG. 6 are a starting point of a calculation of the point of computed gaze, that will be explained later.

Therefore, by continuously imaging the screen beacon 70, the screen tracking camera 92 tracks continuously the position of the screen 52 with respect to the helmet 90. The position information of the screen 52 relative to the user' 50 head is reduced to a set of border points A, B, C, D in a coordinate axis Xi, Yi system.

A second mathematical processing will now be described, in reference with FIG. 6. This second mathematical processing is optional, and preferably does not take place in the algorithm. It is being described herein only because it will help visualization of the algorithm involved. While the coordinate plot of FIG. 6 starts with the initial axis pair of axes Xi, Yi, a final axis pair Xf, Yf is chosen as follows: Of the four identified border points A, B, C and D, the two with the lowest value on the Yi axis are designated the "bottom" border points. The bottom border points in FIG. 6 are C and D. A line CD that joins them is considered drawn, as is known in analytic geometry. The new axis Xf is chosen to be parallel and somewhat below to the line CD. Similarly, the two border points with the lowest value on the Xi axis are designated the "left" border points. The left border points in FIG. 6 are A and D. A line AD that joins them is considered drawn. The new axis Yf is chosen to be perpendicular to axis Xf, and somewhat to the left of line AD. In terms of analytic geometry, the coordinate axes have been shifted and rotated by going from the initial axes Xi, Yi to the final axes Xf, Yf. Therefore, the coordinate values of all points in FIG. 6 have changed, as new axes are being used. Accordingly, the general screen area 98 has not changed shape, but has changed location and orientation with respect to the axes. Different axis systems can equivalently be used, and some advantageously. For example, if Xf coincides with DC, that will give zero values in some of the coordinates, which will shorten the subsequent calculation of the point of computed gaze.

Returning to FIGS. 1 and 2 only, the eye controllable pointer system 60 of the present invention further comprises an eye gaze tracking means 102. The eye gaze tracking means 102 is mounted on the helmet 90 by means of a suitable arm 106. The eye gaze tracking means 102 is situated so that it can detect a gaze direction of at least one eye of the user 50. Preferably the eye gaze tracking means 102 is situated on the side of the helmet 90 that is opposite the screen tracking camera 92, so that the weight of the helmet 90 is distributed evenly over the head of the user 50.

The eye gaze tracking means 102 detects a gaze direction of at least one eye (also known as "the observed eye") of the user 50 by any one of various known eye gaze tracking techniques, or according to a novel such technique described hereinbelow. The eye gaze tracking means 102 of the eye controllable pointer system 60 of the present invention is actually the means necessary to implement the chosen one of these eye gaze tracking techniques.

One such technique is the corneal reflection method, described in U.S. Pat. No. 5,231,674, which is hereby incorporated in the present document by reference. In the corneal reflection method; a beam of IR light is incident at an angle on the observed eye of the user 50. Since the light is in the IR, the user 50 can not perceive it. The cornea of the observed eye reflects the beam, thus producing a reflected beam. The reflected beam is detected, and appears as either a round spot or a small ring shape, depending on the camera resolution. The position of the reflected beam relative to the field of view discloses the gaze direction. In this case, the eye gaze tracking means 102 is an IR light source and the applicable set of detectors, usually including an eye tracking camera that can detect in the IR.

Another eye gaze tracking technique relies on a combination of a horizontal detection technique and an independent vertical detection technique, to determine the position of the pupil of the eye with respect to a camera's field of view (which is assumed stationary). The horizontal detection technique is known in the art as bias tracking. The vertical detection technique relies on the fact that the top eyelid of the observed eye moves in unison with the vertical component of the movement of the eyeball. Thus, the vertical detection technique works by tracking the movement of the eyelid of the observed eye as an edge feature of bright and dark differences. In this case, the eye gaze tracking means 102 is the applicable set of detectors 102.

Yet another applicable novel eye gaze tracking technique will be described later in this document. With all such techniques, the individual technique will determine what is the required eye gaze tracking means 102, as would be obvious to a person skilled in the art in view of the present description. In all these techniques, it is acceptable for the eye gaze tracking means 102 to obstruct the observed eye completely. That is because the user 50 will be looking at the screen 52 with his other eye ("the free eye"), and the observed eye will be moving in unison with the free eye. Alternately, the bulk of the eye gaze tracking means 102 can be attached directly to the helmet 90, with only minimal equipment such as a mirror (not shown) being supported in front of the user's 50 observed eye by the arm 106. If such a mirror is partially transmitting (e.g. a dichroic mirror), the observed eye of the user 50 will not even be obstructed.

Regardless of which specific technique used for detecting the gaze direction of the observed eye, the eye gaze tracking means 102 outputs an eye tracking signal corresponding to the detected gaze direction of the observed eye. The eye tracking signal is in real time, and its content depends on the individual eye tracking technique used. For example, the eye tracking signal can be pupil images, that are to be correlated within a field of view to yield coordinate points. Alternately, the eye tracking signal can be a horizontal and vertical signal, that will become horizontal and vertical coordinate points. Or it can be the position of an IR beam that has been reflected off the cornea of the observed eye.

The eye gaze tracking means 102 is connected with and transmits to the processor 62 the eye tracking signal. The discussion regarding how the screen tracking signal is communicated to the processor 62 applies also to how the eye tracking signal is communicated to the processor 62. If a wireless communication is to be used, the screen tracking signal and the eye tracking signal can be multiplexed for transmission along the same communication channel, if the channel bandwidth is large enough.

The above described processing means is further capable of perceiving and analyzing the eye tracking signal that has been transmitted to the processor 62. The processing means is additionally capable of performing a calculation to produce a point of computed gaze of the user 50 with respect to the screen 52. The point of computed gaze is calculated as a function of the perceived eye tracking signal and the perceived screen tracking signal. The calculation reduces the detected position of the observed eye (with reference to the field of view) to simply values of coordinates of an eye point (with reference to the coordinate axes). A person skilled in the art will be able to implement the processing means in view of the present description.

Figure 7:
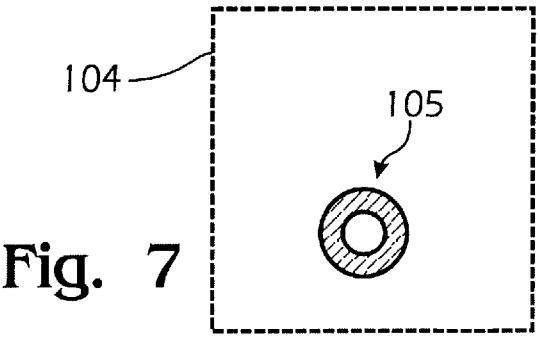
FIG. 7 represents an image of the pupil of the observed eye as received by the eye gaze tracking means of FIG. 1.

The eye tracking signal derived by the eye tracking means 102 of the present invention will be an image of an aspect of the observed eye, if the eye tracking means 102 involves an eye tracking camera 102. Such is shown in FIG. 7, wherein the perimeter 104 is the limit of the focal plane array, and thus represents the field of view 104 of the eye tracking camera 102. The ring 105 is an image of the cornea of the observed eye, as derived by the corneal reflection method. The center of the ring 105 is not illuminated, as it corresponds to the non reflecting pupil of the observed eye. The ring 105 is shown here as complete, while in fact a portion of it (typically a top portion) may be missing, as possibly obstructed by an eye lid.

Figure 8:
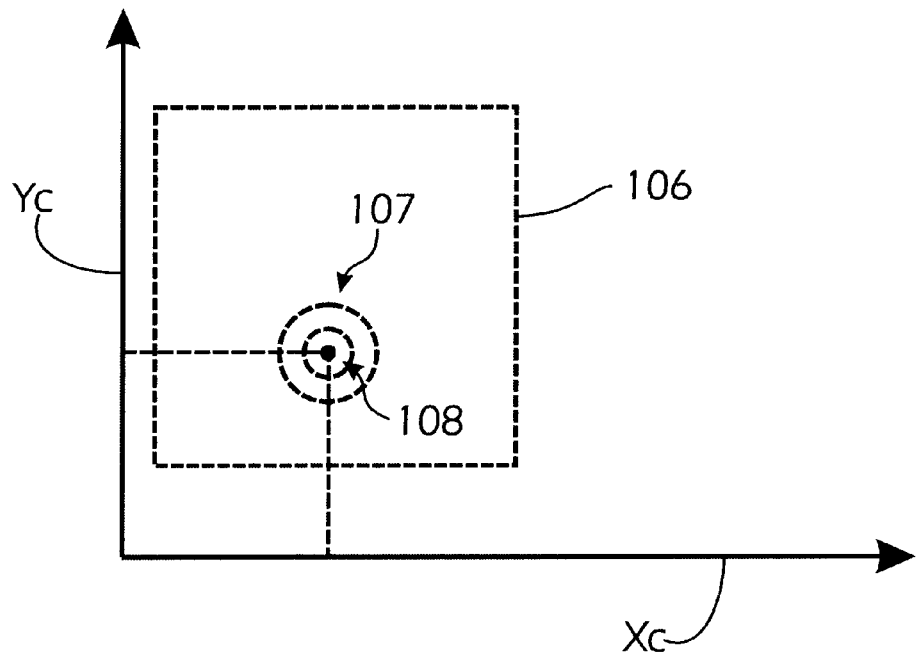
FIG. 8 illustrates an intermediate step in a calculation of the computed point of gaze using the image of FIG. 7.

Processing of the eye tracking signal of FIG. 7 will be threefold, and explained in reference with also FIG. 8. First, the perimeter 104 will be mapped into a perimeter 106 of a suitable coordinate system with respect to the eye tracking camera 102. This new coordinate system comprises two axes Xc and Yc. The ring 105 will be mapped into a ring 107, with respect to the Xc and Yc axes. The ring 107 will be identified by using a suitable edge detection technique to locate two concentric circles that are edge features characterized by a sharp contrast between high and low brightness. If a portion of the ring 105 is missing, an additional algorithm can identify the resulting two concentric arcs, and complete them into circles.

The second step will be to extract the geometric center 108 of the ring 107. That type of extraction is well known from analytic geometry. Third, the coordinate points of the geometric center 108 of FIG. 8 will be mapped into the eye point E of FIG. 6, with new coordinate points with respect to the Xf, Yf axes. The types and amounts of corrections required to make the last conversion depend on the relative positions of the optical components, and can be aided by the aforementioned initialization procedure. Converting an image of the eye into the eye point E of FIG. 6 will be performed in a manner depending on which eye gaze tracking means is specifically utilized, as will be obvious to a person skilled in the art in view of the present description.

Once the coordinates of the eye point E have been determined in FIG. 6, the remaining procedure for the calculation of the point of computed gaze is performed as will be described below. The point of computed gaze will be simply data that will eventually correspond to coordinate values (e.g. (x,y) values) with respect to the screen 52, as is known in the art. As the coordinates have been shifted and rotated in FIG. 6 (by having gone from the axis system of Xi, Yi to that of Xf, Yf), the coordinates of the eye point E have changed along with the coordinates of the border points A, B, C and D. However, the relationship of the point E with respect to the general screen area 98 will not have changed. If the user 50 is looking at any point of the screen 52, the eye point E will always turn out to belong within the shape ABCD.

Once the eye point E has been located within the four border points A, B, C, and D, the entire pattern of FIG. 6 can be processed to produce an equivalent rectangle that corresponds to the screen. Such a processing can be called rectangularization, and can be done in many ways. It is to be noted that the only points needed for a rectangularization method are the four border points A, B, C, D (the screen tracking information) and the eye point E (the eye tracking information). The preferred rectangularization method of the present invention is presented geometrically in FIGS. 9, 10 and 11. The rectangularization process of the present invention is actually performed in software, and is the analytic geometry equivalent of the method that is presented geometrically in FIGS. 9, 10 and 11. The rectangularization process of the present invention will only work for a screen beacon 70 having four point light sources. Other screen beacon systems will require different types of mathematical processing, as will become obvious to a person having reasonable skill in the art.

Figure 9:
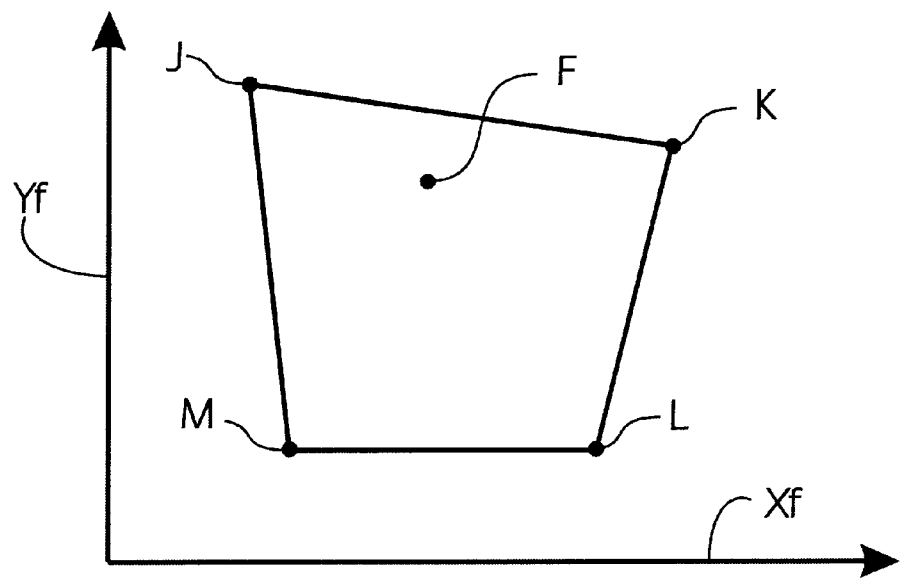
FIG. 9 represents an eye point and a generic shape formed by border points of a general screen area shape.

FIG. 9 presents a generic shape JKLM that is to be rectangularized, with an eye point F. It should be noted that in most situations the shape that is to be rectangularized looks more like the shape ABCD of FIG. 6, and is not as distorted (from a rectangular) a shape as shape JKLM of FIG. 9 suggests, and therefore the resulting corrections are minor. The rectangularization method of the present invention is applied here to the exaggerated shape JKLM of FIG. 9 for clarity. According to the rectangularization process, the border line segments of JKLM are considered in pairs. The same process steps apply to each pair.

Figure 10:
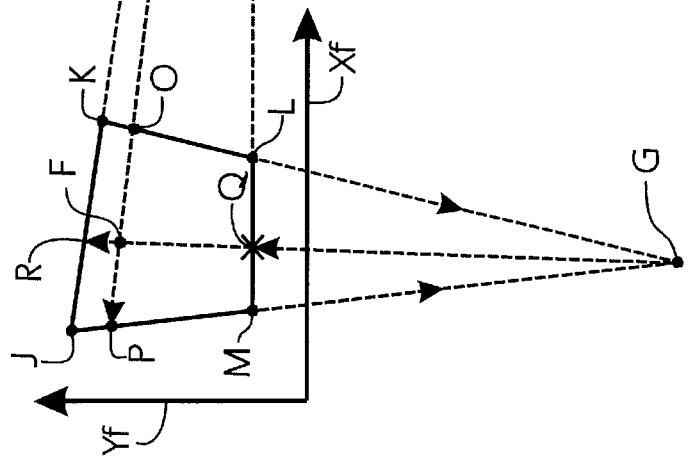
FIG. 10 represents an intermediate step in a rectangularization process of the generic screen area shape of FIG. 9.

In FIG. 10, the segments JK and ML are generally not parallel. If not parallel, then the segments are extended until they meet at a point H. Then a line is drawn through F and H, that intersects segment JM at point P and segment KL at point O. (If the horizontal segments JK and ML were parallel, a line is drawn instead through F that is parallel to JK, and which intersects the other two segments as described.) Similarly with the vertical segments, which are extended to meet at point G. A line through F and G intersects segment JK at point R and segment ML at point Q. Subsequently, the following distances are measured and noted as percentages: JR/JK, KO/KL, LQ/LM and MP/MJ.

Figure 11:
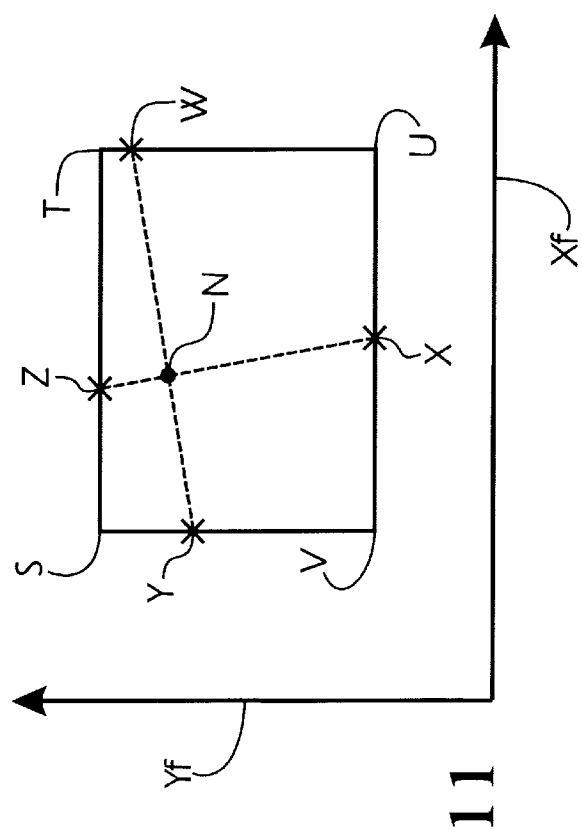
FIG. 11 represents the shape of FIG. 9 after it has been rectangularized according to a method of the present invention that includes the intermediate step of FIG. 10.

Then four points S, T, U, V are chosen as shown in FIG. 11, that form an exact rectangle STUV. The rectangle STUV is chosen in such a way that it has a width-to-height aspect ratio that is exactly equal to that of the screen 52 and of the screen beacon 70. Further, points W, X, Y, Z are chosen on the sides of the rectangle STUV in such a way that SZ/ST= JR/JK, TW/TU=KO/KL, UX/UV=LQ/LM and VY/VS= MP/MJ. Then the points Z and X are joined by a line, and the points Y and W are joined by a line. The point of the intersection of these latter two lines is N, the point of computed gaze. When implemented in software, all of the above method will appear as a few lines of code, with the (x,y) coordinates of the point N being given as a function of the coordinates of the points J, K, L, M and F. This rectangularization procedure could have been applied equivalently to the shape ABCD of FIG. 6.

The eye controllable pointer system 60 of the present invention will typically require an initialization procedure, that may have to be repeated if a new user starts using the system, or if the user 50 changes substantially his distance and/or orientation with respect to the screen 52. The initialization procedure can be implemented in many ways that will be obvious to a person skilled in the art. For example, the user 50 might be asked to look at a trace that appears on the screen 52. The trace can scan the four edges of the actual screen 52. The eye controllable pointer system 60 would then keep track of the eye tracking signal and the screen tracking signal that would be generated. The information will be used to record a number of parameters, for example confirm the identification of the border points A, B, C, D, and measure how much smaller the actual screen area is with respect to the general screen area 98 depicted by the generic shape ABCD of FIG. 6.

Users have heads of differing sizes, and the relative locations of their eyes with respect to their heads differs also. Accordingly, use of the eye controllable pointer system 60 of the present invention by different users would result in a different lateral error for each user. In other words, the point of computed gaze would be laterally shifted away from the point of true gaze 58 by differing amounts for each user 50. Further, to make the system of the present invention modular, different types and sizes of helmets 90 would have to be accommodated by a single software. Each different type of a helmet would generate a different lateral error even for the same user 50. That is why an optional adjustment means 112 is provided.

Referring back to FIGS. 1 and 2, the eye controllable pointer system 60 of the present invention additionally optionally comprises an adjustment means 112. The adjustment means 112 is intended for an initial manipulation by the user 50. Such manipulation is preferably performed in conjunction with an initialization procedure. The adjustment means 112 is capable of affecting the calculation of the point of computed gaze. A manipulation of the adjustment means 112 can cause the point of computed gaze to coincide with the point of true gaze 58.

The adjustment means 112 can be implemented in many ways, as will be readily apparent to a person skilled in the art. As shown in FIGS. 1 and 2, the adjustment means 112 is a stand alone circuit that is contained in a box 112, and imposes a bias on the eye tracking signal. The bias to the calculation is preferably variable and adjustable. Bias in the horizontal dimension can be imposed by adjusting a knob 114, while bias in the vertical dimension can be independently imposed by adjusting a knob 116. A joy stick can also be used, instead of the knobs 114, 116. The adjustment means 112 can also be adjustments available with respect to the angle of mirrors present on the helmet 90. Such adjustment of mirrors would affect the calculation of the point of computed gaze by shifting the input image in the horizontal and vertical dimensions.

The adjustment means 112 can alternately be implemented in software as adjustment software. The eye controllable pointer system 60 of the present invention could display a mark at the point of computed gaze, and ask the user 50 to hit the arrow keys of a typical computer keyboard, to shift the location of the displayed mark to the point of actual gaze. An even better embodiment does not require the user 50 to hit any keys, but displays a mark at the midpoint (and later other points) of the screen 52, and asks the user 50 to look at it for a while. The adjustment software then receives its inputs from the eye gaze tracking means 102 and the screen tracking camera 92, calculates the point of computed gaze, and thus finds how large are the lateral shifts that must be added to its calculation, so that the calculated point of computed gaze will turn out to be at the midpoint of the screen 52. As such the adjustment software is preferably a subprogram of the processing means. When such an embodiment is presented as executable code, the adjustment means 112 and the processing means appears as a single software.

As the adjustment means 112 is shown in FIGS. 1 and 2, its inputs affect the position of point E within the generic shape ABCD of FIG. 6. That is not necessary, however. If implemented in software, the inputs of the adjustment means can alternately affect the position of point N within the exact rectangle STUV of FIG. 11.

The exact rectangle STUV of FIG. 11 represents the general screen area, as ultimately defined and delimited by the screen beacon 70, not by the actual screen 52. The above calculated point of computed gaze N can be further correlated to the exact screen area in a number of ways. Some more processing involving scaling and shifting may be necessary to produce the final point of computed gaze, processing which will also depend on the initialization procedure, as will be obvious to a person skilled in the art in view of the present description. For example, if the width-to-height aspect ratio of the light sources 74, 76, 78, 80 screen beacon 70 is identical to that of the screen 52, and if the screen beacon 70 has been placed over the screen 52 in ways that their diagonals coincide, the required processing will be less, after the above described rectangularization process has been performed. Even if the above condition is not met, the initialization procedure of scanning the four corners and/or edges will have informed the system where the actual screen 52 is with respect to the exact rectangle STUV.

Figure 12:
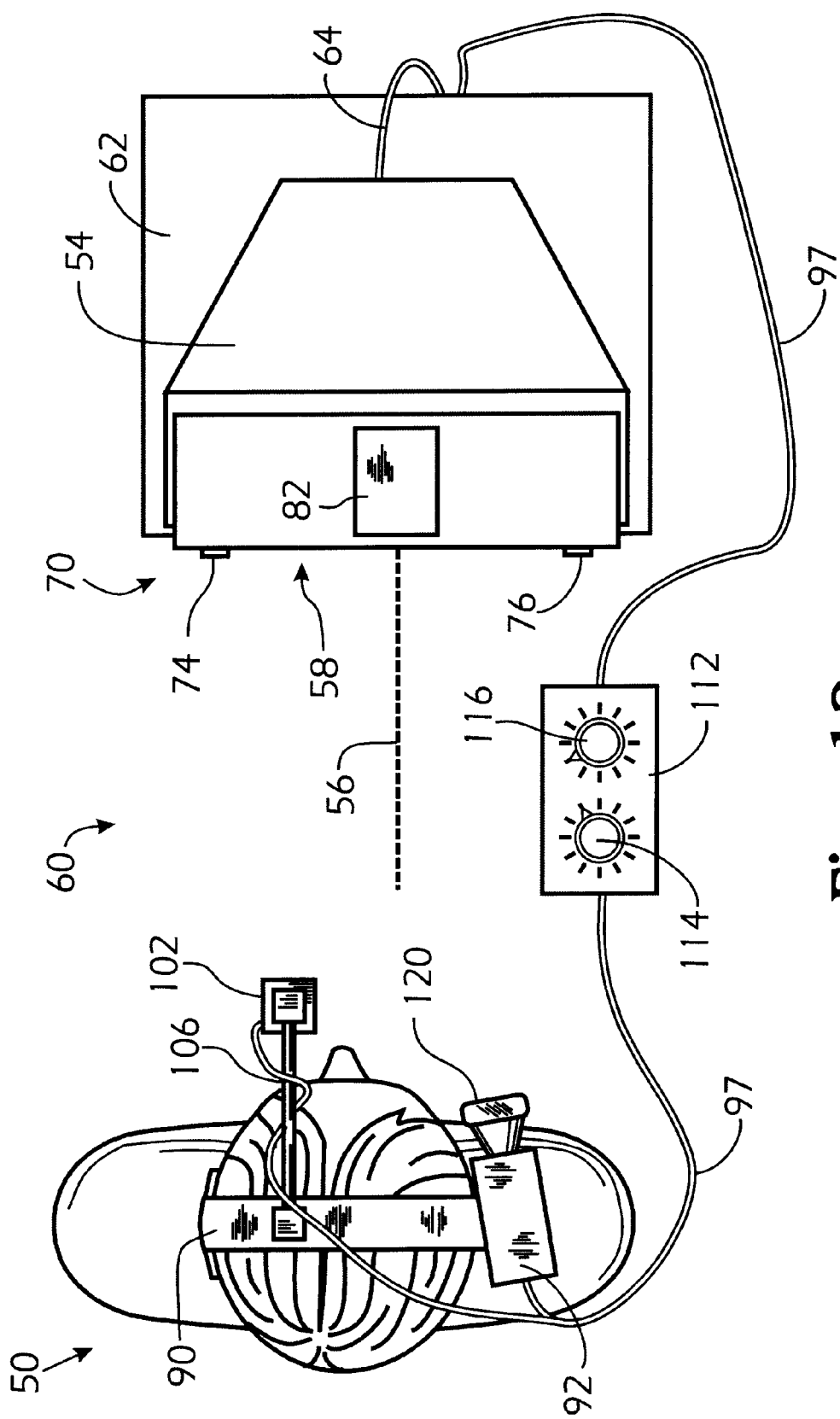
FIG. 12 shows the embodiment of FIG. 2, wherein a pass-IR filter is placed in front of the screen tracking camera.

An improved embodiment of the present invention will now be described in connection with FIGS. 12 and 13. From the above discussion, it should be apparent that when a suitably designed and placed screen beacon 70 is being used, the only images that are of interest to the screen tracking camera 92 are images generated by the screen beacon 70. Accordingly, an improved embodiment is shown in FIG. 12. FIG. 12 is identical to FIG. 2, except that a pass-IR filter 120 has been placed in front of the screen tracking camera 92. A pass-IR filter is an optical filter that does not allow visible light to go through, but allows IR light to go through. Further according to this improved embodiment, the light sources 74, 76, 78, 80 of the screen beacon 70 emit IR light. That is accomplished by having the light sources 74, 76, 78, 80 be IR LEDs.

Figure 13:
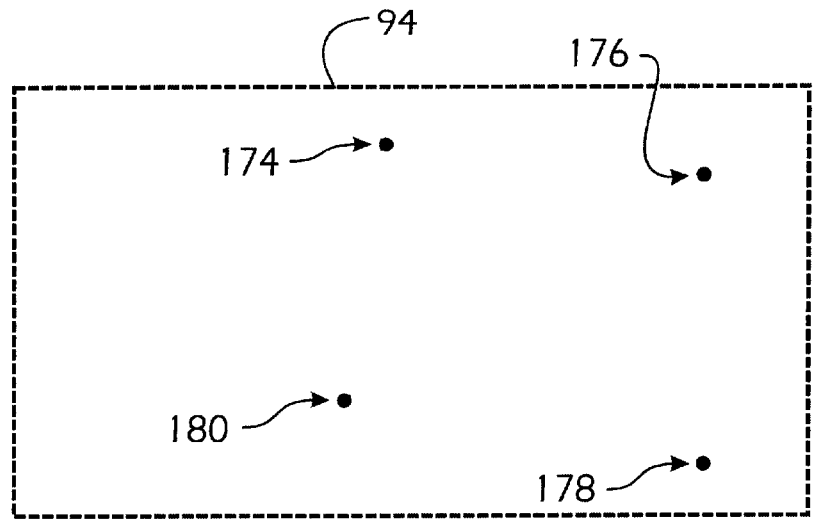
FIG. 13 represents a typical image received by the screen tracking camera of FIG. 12.

FIG. 13 represents a typical image received by the screen tracking camera 92 of FIG. 12. This image is practically identical to that of FIG. 5, except that only the screen beacon images 174, 176, 178 and 180 are shown. Any image of the screen 52, along with all other ambient light, has been filtered out by the pass-IR filter 120. This shortens the processing time, as the detected bright points 174, 176, 178 and 180 will be confirmed faster as being the images produced by the light sources 74, 76, 78 and 80 of the screen beacon 70.

An additional improvement will now be described for the eye controllable pointer system 60 of the present invention. The eye controllable pointer system 60 preferably also includes driving means connected with the screen 52. The driving means is capable of perceiving the point of computed gaze and of projecting a mark on the screen 52 at the point of computed gaze. The mark is projected for feedback to the user 50, to confirm his screen selections. The driving means can be any suitable screen driving means, such as a mouse driver. The mark can be of any suitable shape, such as an arrow, cross hairs, a cursor, etc.

A novel eye gaze tracking means 102 will now be described in connection with FIGS. 1 and 2. The eye gaze tracking means 102 can be an eye tracking camera 102 just like the screen tracking camera 92. In fact all comments made about the requirements of the screen tracking camera 92 apply also to the eye tracking camera 102, except that the resolution at the focal plane does not have to be as high. Accordingly, the eye gaze tracking means 102 can be a video camera 102. Video cameras that are as small as is suggested by video camera 102 of FIGS. 1 and 2 are available in the open market.

The eye tracking camera 102 is mounted on the helmet 90 by means of a suitable arm 106. It can be placed so that it faces directly at the observed eye of the user, and does not move with respect to it. The eye tracking camera 102 has a field of view, which is a solid angle. The eye tracking camera 102 detects a gaze direction of the observed eye of the user 50 by imaging a relative position of the pupil of the observed eye with respect to the field of view.

Mounted as shown in FIGS. 1 and 2, the structure formed by the arm 106 and the eye tracking camera 102 can be heavy, and might therefore oscillate with respect to the helmet 90, if the user 50 moves his head quickly. This problem is exacerbated if the eye tracking camera 102 is heavy, but can be alleviated as is shown in FIG. 14.

An alternate embodiment of the eye tracking camera 102 of the present invention will now be described in reference with FIG. 14. In FIG. 14, the eye tracking camera 122 is identical in construction to the screen tracking camera 92. An arm 126 supports a combination of two mirrors 128, 130, and a lens 132. The mirrors 128, 130, and the lens 132 assist in imaging the observed eye, and optionally with some magnification. The exact use of mirrors and lenses for imaging will be determined in accordance with the system requirements. Such a determination will be obvious to a person having reasonable skill in the art, in view of the present description. By having been placed on the side of the helmet 90, the heavier eye tracking camera 122 will not contribute to an oscillation of the structure at the end of the arm 126. The image received by the eye tracking camera 122 will be similar to that of FIG. 7, except that the image will be a circle instead of a ring 105. Again, this image may be partially obstructed by an eyelid. Processing will be similar to that of FIG. 8, i.e. it will find the center of the circle, move it in the same coordinate system with the border points, etc.

Figure 14:
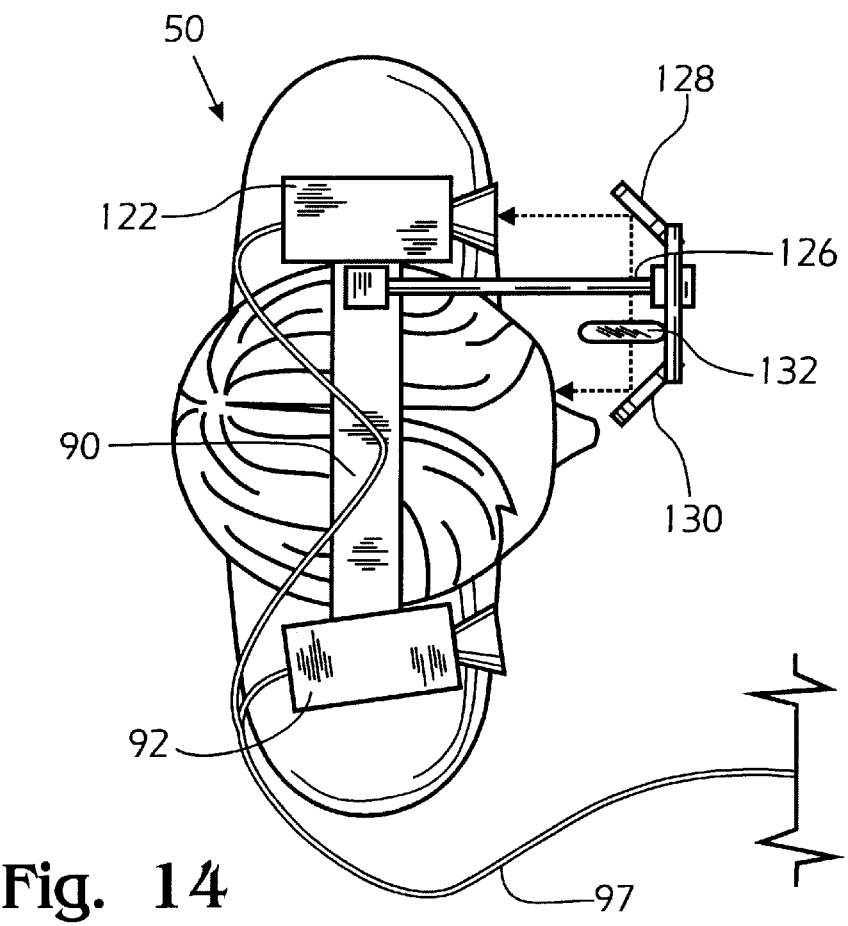
FIG. 14 illustrates a plan view of a user wearing a helmet according to another embodiment of the present invention, wherein the eye gaze tracking means is implemented by an eye tracking camera moved to the side of the helmet.

Of course, the embodiment of FIG. 14 can also be implemented in conjunction with a pass-IR filter 120 in front of the screen tracking camera 92, and with the light sources 74, 76, 78 and 80 of the screen beacon 70 emitting IR light. Further, a screen driver can provide feedback to the user 50 by projecting a mark on the screen 52 at the point of computed gaze.

Figure 15:
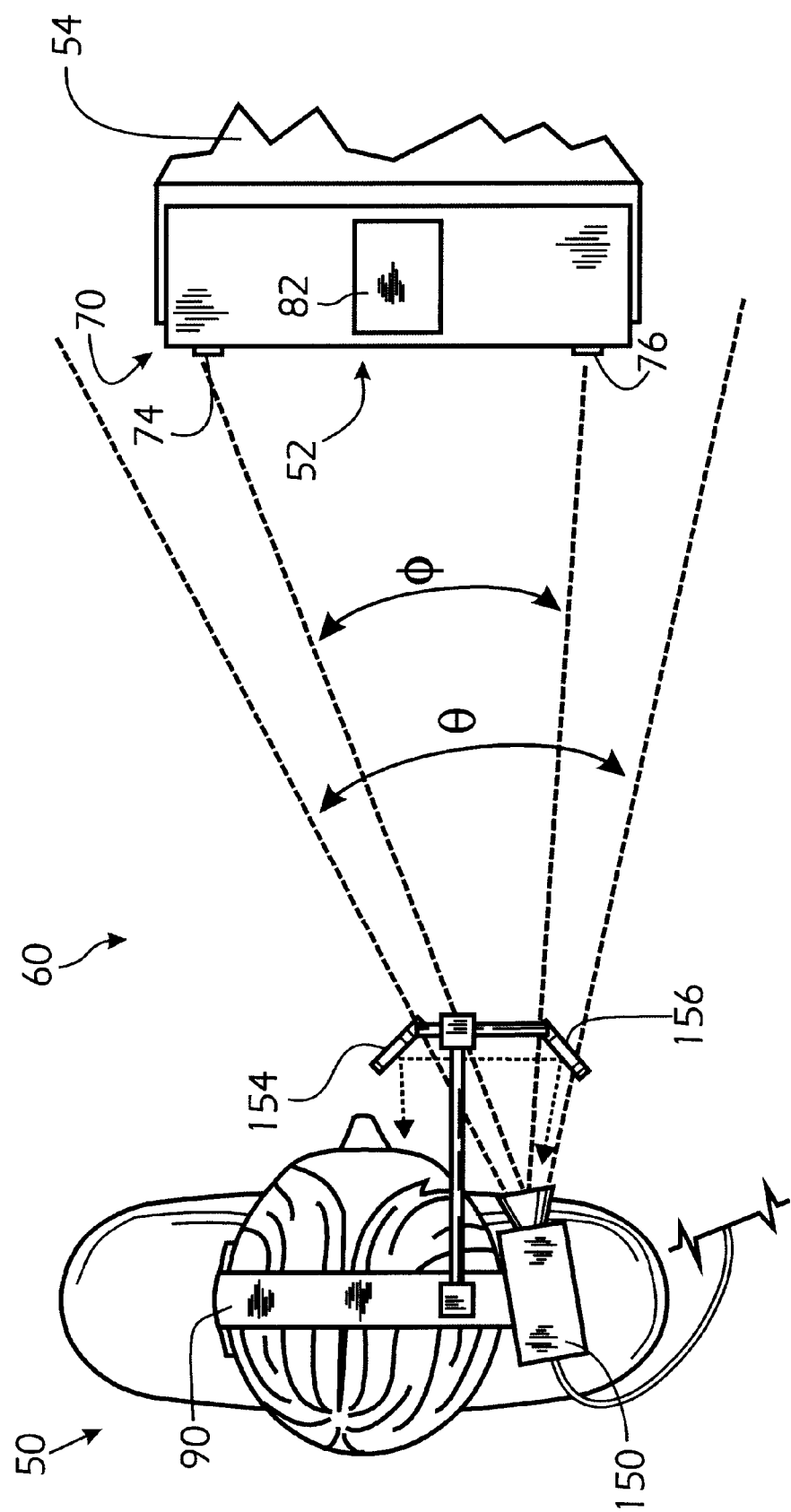
FIG. 15 illustrates a plan view of a user wearing a helmet according to yet another embodiment of the present invention, wherein a single camera is used for both screen tracking and eye gaze tracking.

An alternate embodiment of the present invention will now be described in reference with FIGS. 15, 16 and 17. In this alternate embodiment a single camera 150 is used for both the screen tracking function and the eye gaze tracking function, thus resulting in a simplified apparatus. Everything else is the same as above, except as described below. FIG. 15 illustrates a plan view of a user 50 wearing a helmet 90 according to such an embodiment. A single camera 150 is attached to the side or the top of helmet 90. The camera 150 is the same type of camera described in connection with the screen camera 92 of FIGS. 1 and 2, and oriented the same way. Additionally, two mirrors 154, 156 image the observed eye into the camera 150. The mirrors 154, 156 are shown here without the requisite supporting arms, so that the drawing will not be unduly complicated. Thus, a single camera 150 is being used for both screen tracking and eye gaze tracking.

For the embodiment of FIG. 15 to work, at least one mirror is necessary for the camera be able to receive images of the observed eye of the user 50. Various configurations with mirrors are possible. The mathematical processing required will be determined by the specifics of the configuration utilized. Note that at least one mirror (in FIG. 15 that is mirror 156) will have to be within the field of view θ of the camera 150, if considered from the plan view of FIG. 15. That mirror 156, then, will present an obstruction to the field of view θ of the camera 150. That can be dealt with in two ways. First, the system designer can choose a camera 150 that has a wide enough field of view θ, so that the mirror 156 in question will not be obstructing imaging of the screen beacon 70. In other words, the angle φ subtended by the LEDs 74, 76 from the viewpoint of the camera 150 will be smaller than θ, by enough angle to allow the mirror 156 to be within the field of view θ. The second way would be to make the mirror in question (here mirror 156) partially transmitting.

Figure 16:
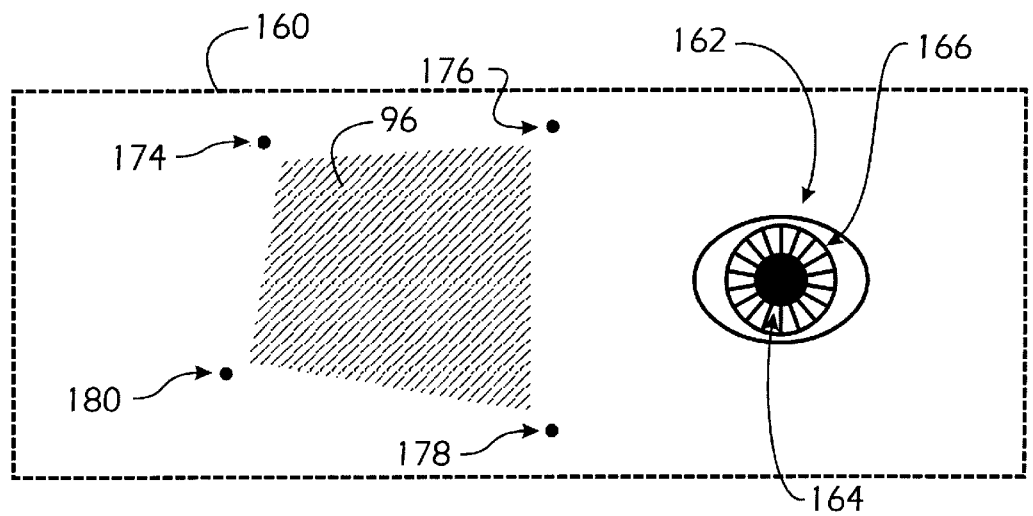
FIG. 16 represents the image received by the single camera of FIG. 15.

FIG. 16 represents the image received by the single camera 150 of FIG. 15. (The actual image is spatially inverted, etc.) The perimeter 160 is the limit of the focal plane array, and thus represents the field of view of the camera 150. The features of the image are four screen beacon images 174, 176, 178 and 180, a screen image 96 of the screen 52, and an image 162 of the eye. The four screen beacon images 174, 176, 178 and 180 and the screen image 96 are bright compared to ambient, and as described before in connection with FIG. 5. The image 162 of the eye has the features of the image 164 of the pupil, and the image 166 of the cornea, images which appear again dark against the ambient background. Again, just like the image of the camera 122 of FIG. 14, a portion of the image 162 of the eye could be obstructed by an eyelid. The main difference is that the image 162 of the eye is already cast within the same focal plane as the screen beacon images 174, 176, 178 and 180.

The camera 150 transmits a single signal to the processor 62 (not shown) that corresponds to images received by the camera 150. The signal now contains screen tracking information that is combined with eye tracking information. The processing means is capable of perceiving and analyzing the signal received by the camera, and of further performing a calculation to produce a point of computed gaze of the observed eye of the user 50 with respect to the screen 52 as a function of the signal.

Figure 17:
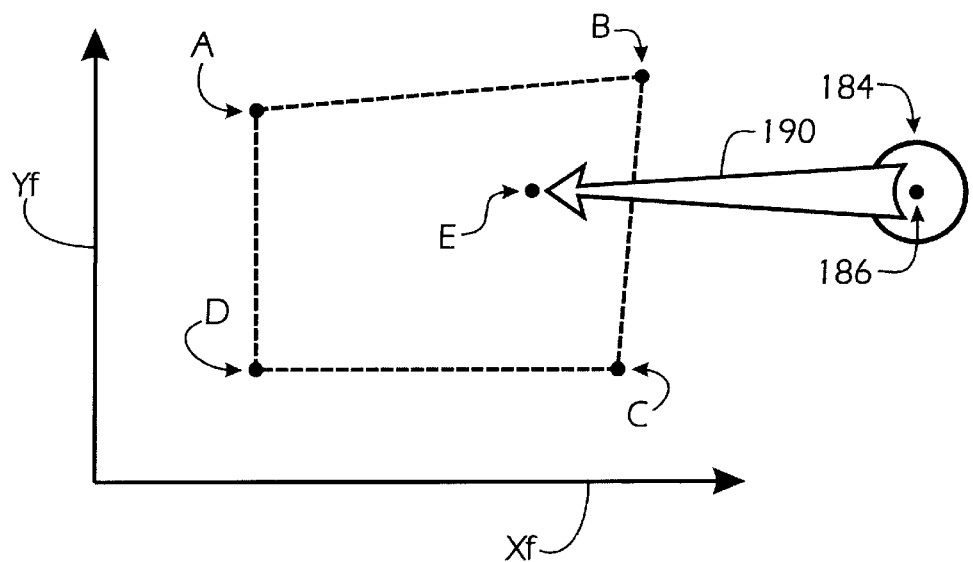
FIG. 17 illustrates an intermediate step in the calculation of the computed point of gaze for the embodiment of FIG. 15.

FIG. 17 illustrates an intermediate step in the calculation of the computed point of gaze for the embodiment of FIG. 15. The screen beacon images 174, 176, 178 and 180 have been mapped into points A, B, C and D, as already described in connection with FIG. 6. The image 164 of the pupil has been mapped into a circle 184, and its geometric center 186 will again be extracted. (Although the point 186 is initially shown outside the shape ABCD, such is not always necessarily the case.) Then the point 186 will be shifted according to arrow 190, to yield an eye point E. The shape of FIG. 17 will be subsequently rectangularized, as was described in connection with the shape of FIG. 6.

The arrow 190 represents the mathematical operation of a correction, that is made because the screen and eye images do not coincide to begin with. The arrow 190 represents a shift in coordinates that will be determined by many factors, such as number and configuration of the mirrors 154, 156 and lenses, if any, distance of the user 50 from the screen 52, inputs from the initialization procedure, etc. Moreover, if one of the images requires further inversion for correlation, the length of the arrow 190 may vary depending also on the initial coordinates of point 186. The person skilled in the art will be able to determine how to put these factors together for a specific system, in view of the prior art and the present description.

Of course, a variant of the embodiment of FIG. 15 can also be implemented in conjunction with the above described embodiment of a pass-IR filter to facilitate computing. Such a variant is described in reference with FIG. 18, where a pass-IR filter 120 has been placed in front of the camera 150. The light sources 74, 76, 78 and 80 of the screen beacon 70 emit IR light. In such an application, however, a visible image 170 (of FIG. 16) of the observed eye would get filtered out by the pass-IR filter 120, along with all the other visible images and ambient light. That is why such an application also requires that imaging of the eye position happens with IR light sources only. That can be accomplished by adding at least one more IR source 194 to illuminate the eye, and use of a technique based on IR detection, such as the corneal reflection method, as will be obvious to a person having reasonable skill in the art, in view of the present description.

Figure 18:
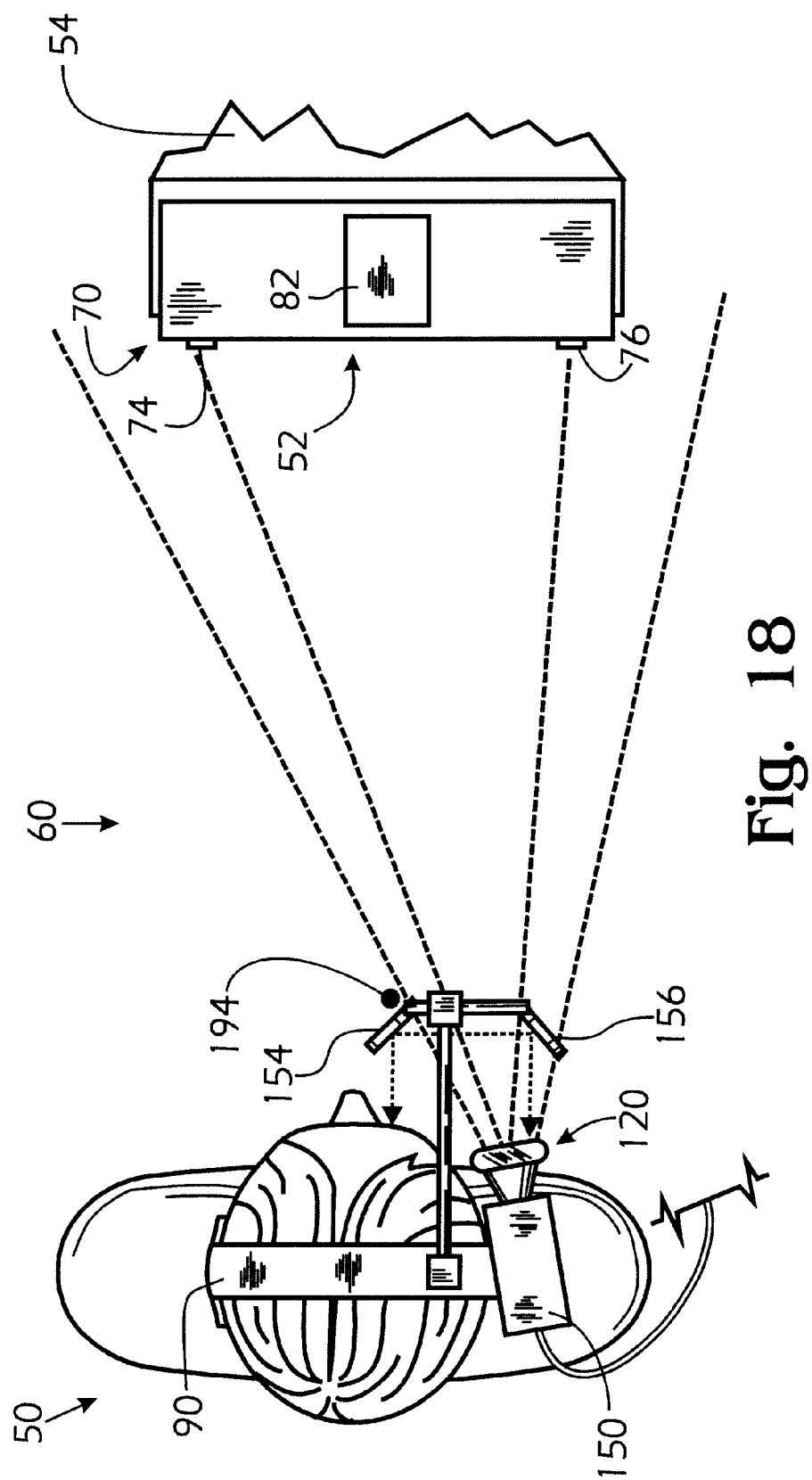
FIG. 18 illustrates the embodiment of FIG. 15 further comprising an IR source to illuminate the eye and a pass-IR filter in front of the camera.
Figure 19:
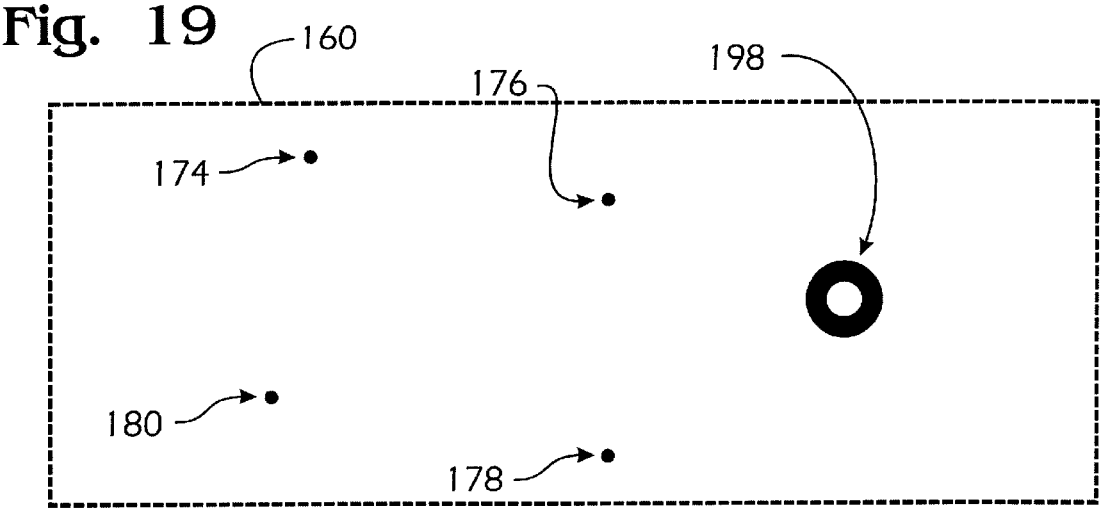
FIG. 19 represents the image received by the camera of FIG. 18.

FIG. 19 represents the image received by the camera 150 of FIG. 18. Again, the light sources 74, 76, 78, 80 of the screen beacon 70 are imaged as points 174, 176, 178 and 180. However, the screen image 96 has been filtered out, and a ring 198 represents the imaged cornea of the observed eye.

The algorithm of the processing means will first identify and confirm the screen beacon images 174, 176, 178 and 180, then the eye image 198. Then the eye image 198 will be reduced to a point (its center). Then the appropriate mathematical operation of the arrow 190 of FIG. 17 is applied to the eye image 198, and then the rectangularization procedure is performed to calculate the point of computed gaze that has been described above. Additionally, if the corneal reflection method is being employed, the operation of the arrow 190 might have to correct for a double incremental angle, and could therefore be further dependent on the initial coordinates of the eye image 198. The double incremental angle arises because of how the corneal reflection technique is implemented. When the direction of gaze of the observed eye shifts by an incremental angle, the beam reflected off the cornea will shift by double that incremental angle.

Further, in the embodiments of FIGS. 15–19, it is preferred that a screen driver provides feedback to the user 50 by projecting a mark on the screen 52 at the point of computed gaze.

The above described embodiments will work with a wide range of possible distances of the user 50 from the screen 52. The user 50 must be far enough away from the screen 52 so that all four screen beacon light sources 74, 76, 78, 80 are imaged. However, if the user 50 is too far from the screen 52, the resolution may deteriorate, as the screen 52 would appear too small. The deterioration of the resolution can be addressed by including optionally an adjustable zooming lens in front of the screen tracking camera 92 of FIG. 1 or the camera 150 of FIGS. 15 and 18. Zooming lenses are known in the prior art to magnify or minify a received image. Some video cameras are outfitted with zooming lenses at the point of sale. The zooming lens can be adjustable manually or automatically by the system to yield a general screen area of a desirable size. Such an adjustment may be advantageously combined with the above described initialization procedure. Zooming adjustment information is preferably passed on to the processing means to help determine a concomitant adjustment in calculating the point of computed gaze.

In all of the above described embodiments there was a stand alone screen beacon 70 whose light sources 74, 76, 78 and 80 aid the screen tracking camera 92 or 150. Alternately, the screen tracking camera 92 or 150 can be aided by a screen beacon signal, which is projected on the screen 52 itself by a beacon projector. The screen beacon signal is a light pattern that will aid the screen tracking camera 92 or 150. This alternate implementation is described below in terms of FIGS. 20 and 21.

Figure 20:
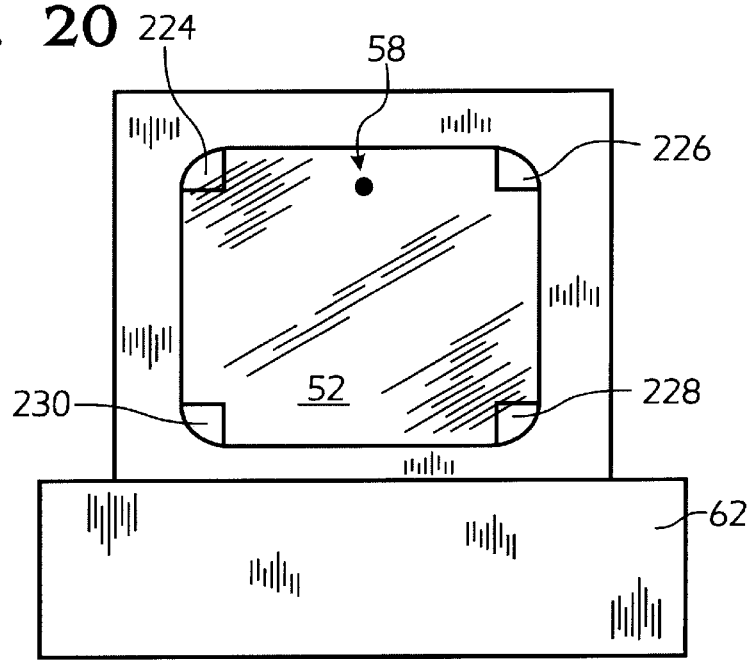
FIG. 20 illustrates the appearance of a screen that has superimposed on it the visual pattern of a screen beacon signal.

According to this alternate implementation, everything else is as was described above, except as follows. A beacon projector is connected with the screen 52. The beacon projector can be implemented by suitably adapting a screen driver to produce a visual pattern. The beacon projector preferably works in conjunction with the processing means. The beacon projector superimposes a continuing screen beacon signal on the regular screen display. The continuing screen beacon signal can be any visual pattern that can be projected on the screen 52, imaged by the screen tracking camera 90 or 150, and incorporated in the screen tracking signal in such a way that it can be recognized by the processing means. FIG. 20 illustrates the appearance of screen 52 that has superimposed on it a visual pattern of a screen beacon signal. The visual pattern is four lit spots 224, 226, 228, 230, appearing at the four corners of the screen 52. Alternately, the visual pattern could have been lit edges of the screen 52.

Another possibility is to have the visual pattern be displayed only periodically. The continuing screen beacon signal would then be intermittent, and its visual pattern would be time multiplexed with the regular screen display. As with designing a screen beacon 70, the idea behind choosing the light pattern of the screen beacon signal is that it be non intrusive to the user's 50 viewing of the screen 52. Accordingly, screen reaction times and human eye reaction times would then be addressed, to design a beacon projector that will project a visual pattern for times that are long enough to be detected but short enough to not annoy or even be perceived by the user 50. Further in such a case, the screen tracking camera or the processing means should be able to account for the screen beacon signal being intermittent, maybe by using a sync signal, etc. If such is accomplished, then the ideal visual pattern for the screen beacon signal would be simply to light up the whole screen 52. (Then the whole screen 52 would somewhat correspond to the extended light source that was discussed in connection with the screen beacon.)

The screen tracking camera 90 or 150 of the eye controllable pointer system 60 of the present invention is oriented in such a way that it can receive images of the screen beacon signal. To do so, it faces (and images) the screen 52, and thus it also images the screen beacon signal.

Figure 21:
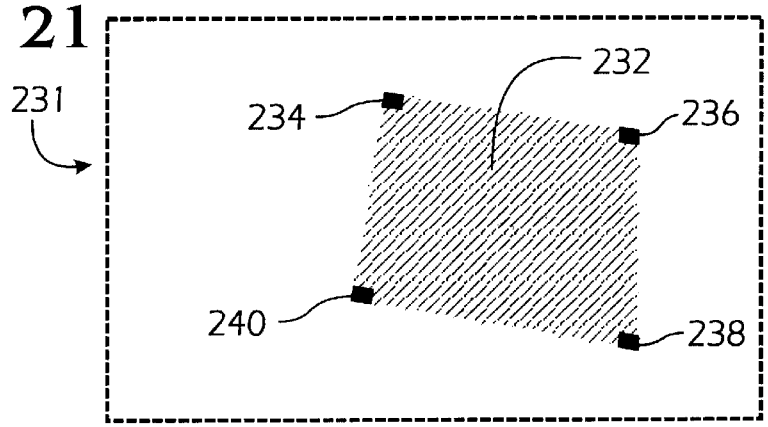
FIG. 21 represents the image of the screen of FIG. 20 as received by a screen tracking camera.

FIG. 21 represents the image of the screen of FIG. 20 as received by a screen tracking camera 92 or 150. The perimeter 231 shows the limits of the focal plane array, and thus it represents the field of view of the screen tracking camera 92 or 150. The shaded area 232 is the image 232 of the screen 52. Note that in the general case the shaded area 232 is not a perfect rectangle, again owing to the single point perspective of the camera 92 or 150, which is generally off the center line 56 of the screen 52. The image 232 of the screen 52 can have bright and dark areas. At the four corners of the image 232 there are four spots 234, 236, 238 and 240, that correspond respectively to the visual pattern of the four lit spots 224, 226, 228 and 230. These four spots 234, 236, 238 and 240 are the image of the screen beacon signal 224, 226, 228 230. Even if the whole screen 52 turns dark, the screen pointer system will be able to determine the location of the screen 52 from the image 234, 236, 238 and 240 of the screen beacon signal 224, 226, 228 and 230.

The processing means distinguishes the visual pattern of the screen beacon image 234, 236, 238 and 240. Softwares for optical pattern recognition are well known, and can be designed for the chosen visual pattern of the screen beacon image 234, 236, 238 and 240. The processing means can avail itself of other inherent attributes of the screen beacon image 234, 236, 238 and 240, to ensure accuracy. Such an attribute is that the visual pattern can represent exactly the screen 52. The area between the four imaged screen beacon signal points 234, 236, 238 and 240 is no longer the general screen area 98 of FIG. 6, but is an exact screen area, for processing purposes. Further, the processing means does not have to correct for a possible misplacement of a screen beacon 70 over the screen 52.

The processing means will further interpret the eye tracking signal as was described above, in embodiments where the detection of the eye gaze direction is independent of the screen tracking camera 92, (e.g. FIGS. 1, 2, 14). In embodiments where the location of the pupil of the observed eye is imaged by the screen tracking camera 150 (e.g. in FIG. 15), the image of FIG. 21 will also include an eye pupil image, which will be processed as described in connection with FIG. 16.

These embodiments will also work well with the above described zooming lens. Additionally, these embodiments preferably also have a driving means connected with the screen 52, which is capable of perceiving the point of computed gaze and of projecting a mark on the screen 52 at the point of computed gaze, for feedback to the user 50.

In the above description numerous details have been set forth in order to provide a more thorough understanding of the present invention. It will be obvious, however, to one skilled in the art that the present invention may be practiced without these specific details. In other instances, well known features have not been described in detail in order to not obscure unnecessarily the present invention.

What is claimed is:

1. An eye controllable pointer system for determining a point of true gaze of a user with respect to a screen, comprising:

a screen beacon including a plurality of light sources, the light sources fixed with respect to the screen and arranged noncollinearly;

a helmet secured to the head of the user;

a screen beacon tracking camera mounted on the helmet and situated to receive an image of the plurality of light sources, the screen beacon tracking camera producing a beacon tracking signal corresponding to the image received by the beacon tracking camera;

an eye gaze tracker mounted on the helmet, the eye gaze tracker detecting a gaze direction of at least one eye of the user, and producing an eye tracking signal corresponding to the detected gaze direction; and a processor that receives the beacon tracking signal and the eye tracking signal and calculates a point of computed gaze of the user with respect to the screen as a function of the eye tracking signal and the beacon tracking signal.

2. The eye controllable pointer system of claim 1, further comprising a controller for adjusting the point of computed gaze with respect to the point of true gaze.

3. The eye controllable pointer system of claim 2, further comprising a screen driver that displays a marker on the screen, the marker indicating the point of computed gaze with respect to the screen.

4. The eye controllable pointer system of claim 3, wherein the screen driver displays a marker on the screen, the marker indicating the point of true gaze with respect to the screen.

5. The eye controllable pointer system of claim 1, further comprising a screen driver that displays a marker on the screen, the marker indicating a location of the point of true gaze with respect to the screen.

6. The eye controllable pointer system of claim 1, wherein the eye tracker includes an eye tracking camera that receives an image of at least one eye of the user to produce the eye tracking signal.

7. The eye controllable pointer system of claim 1, wherein the plurality of light sources is arranged in a predetermined shape in a plane substantially parallel to the screen.

8. The eye controllable pointer system of claim 1, further comprising a zoom lens that forms the image of the light sources received by the screen beacon tracking camera.

9. The eye controllable pointer system of claim 1, further comprising a screen driver that places at least one light source of the screen beacon on the screen.

10. The eye controllable pointer system of claim 1, further comprising a screen driver that places at least one of the plurality of light sources of the screen beacon on the screen intermittently so that the light source is substantially imperceptible to the user.

11. The eye controllable pointer system of claim 1, wherein the light sources of the screen beacon emit infrared radiation.

12. The eye controllable pointer system of claim 1, further comprising a beacon controller that intermittently activates the light sources of the screen beacon.

13. An eye controllable pointer system for determining a point of true gaze of a user with respect to a screen, comprising:

a screen beacon including a plurality of light sources, the light sources fixed with respect to the screen and arranged noncollinearly in a predetermined shape in a plane substantially parallel to the screen;

a helmet secured to the head of the user;

a screen beacon tracking camera mounted on the helmet and situated to receive an image of the plurality of light sources, the screen beacon tracking camera producing a beacon tracking signal corresponding to the image received by the beacon tracking camera;

an eye gaze tracker mounted on the helmet, the eye gaze tracker detecting a gaze direction of at least one eye of the user, and producing an eye tracking signal corresponding to the detected gaze direction; and a processor that receives the beacon tracking signal and the eye tracking signal and calculates a point of computed gaze of the user with respect to the screen as a function of the eye tracking signal and the beacon tracking signal, wherein the image of the plurality of light sources has a distorted shape, and the processor calculates a transformation that transforms the distorted shape into a shape proportional to the predetermined shape in order to determine the point of computed gaze.

14. The eye controllable pointer system of claim 13, further comprising a controller for adjusting the point of computed gaze with respect to the point of true gaze.

15. The eye controllable pointer system of claim 14, further comprising a screen driver that displays a marker on the screen, the marker indicating the point of computed gaze with respect to the screen.

16. The eye controllable pointer system of claim 15, wherein the screen driver displays a marker on the screen, the marker indicating the point of true gaze with respect to the screen.

17. The eye controllable pointer system of claim 13, further comprising a screen driver that displays a marker on the screen, the marker indicating a location of the point of true gaze with respect to the screen.

18. The eye controllable pointer system of claim 13, wherein the plurality of light sources is arranged in the predetermined shape in a plane substantially parallel to the screen.

19. The eye controllable pointer system of claim 13, further comprising a screen driver that places at least one light source of the screen beacon on the screen.

20. The eye controllable pointer system of claim 13, further comprising a screen driver that places at least one of the plurality of light sources of the screen beacon on the screen intermittently so that the light source is substantially imperceptible to the user.

21. The eye controllable pointer system of claim 13, further comprising a beacon controller that intermittently activates the light sources of the screen beacon.

22. A method for determining a point of true gaze of a user with respect to a screen, comprising:

fixing at least three noncollinearly arranged light sources with respect to the screen;

producing a screen beacon tracking signal corresponding to an image of the light sources;

detecting a gaze direction of at least one eye of the user, and producing an eye tracking signal corresponding to the detected gaze direction; and calculating a point of computed gaze of the user with respect to the screen as a function of the screen beacon tracking signal and the eye tracking signal.

23. The method of claim 22, further comprising adjusting the point of computed gaze with respect to the point of true gaze.

24. The method of claim 23, wherein the screen driver adjusts the point of computed gaze by adjusting the locations of the light sources.

25. The method of claim 22, further comprising displaying a marker indicative of the point of computed gaze with respect to the screen.

26. The method of claim 22, further comprising displaying a marker indicative of the point of true gaze with respect to the screen.

27. The method of claim 22, wherein the light sources are located on the screen.

28. The method of claim 22, further comprising activating the light sources intermittently so that the light sources are substantially imperceptible to the user.

29. An eye controllable pointer system for determining a point of true gaze of a user with respect to a screen, comprising:

four light sources, fixed with respect to the screen and arranged at corners of a rectangle having dimensions proportional to corresponding dimensions of the screen;

a helmet securable to the head of the user;

a screen beacon tracking camera mounted on the helmet, the beacon tracking camera including a beacon lens having a beacon lens axis, the screen beacon tracking camera situated to receive an image of the rectangle of light sources, the screen beacon tracking camera producing a beacon tracking signal corresponding to the image;

an eye gaze tracker mounted on the helmet for detecting a gaze direction of at least one eye of the user, the eye gaze tracker including an eye gaze tracking camera and an eye gaze lens having an eye gaze lens axis, the eye gaze tracking camera receiving an image of at least a portion of an eye of the user along the eye gaze lens axis and producing an eye tracking signal corresponding to a detected gaze direction, wherein the beacon lens axis and the eye gaze lens axis are not coaxial;

a processor that receives the screen beacon tracking signal and the eye tracking signal, the processor calculating a transformation that transforms the distorted image received by the screen beacon camera into a rectangular image with dimensions corresponding to the dimensions of the rectangle of light sources, and calculates a point of computed gaze of the user with respect to the screen as a function of the eye tracking signal and the transformation;

a controller, adjustable to align the point of computed gaze and the point of true gaze; and a screen driver that displays a marker on the screens the marker indicative of the point of true gaze.

30. An eye controllable pointer system for determining a point of true gaze of a user with respect to a screen, comprising:

a screen beacon including a plurality of light sources, the light sources fixed with respect to the screen and arranged in a predetermined shape;

a helmet secured to the head of the user;

a screen beacon tracking camera mounted on the helmet and situated to receive an image of the plurality of light sources having a distorted shape, the screen beacon tracking camera producing a beacon tracking signal corresponding to the image received by the beacon tracking camera;

an eye gaze tracker mounted on the helmet, the eye gaze tracker detecting a gaze direction of at least one eye of the user, and producing an eye tracking signal corresponding to the detected gaze direction; and a processor that receives the beacon tracking signal and the eye tracking signal and calculates a point of computed gaze of the user with respect to the screen as a function of the eye tracking signal and the beacon tracking signal based on the predetermined shape and the distorted shape.

* * * * *